US012540278B2

(12) United States Patent
Ayyappanpillai et al.

(10) Patent No.: US 12,540,278 B2
(45) Date of Patent: Feb. 3, 2026

(54) TEMPERATURE PROGRAMMABLE SMALL MOLECULES FOR THERMORESPONSIVE SMART WINDOWS AND APPLICATIONS THEREOF

(71) Applicant: COUNCIL OF SCIENTIFIC AND INDUSTRIAL RESEARCH, New Delhi (IN)

(72) Inventors: Ajayaghosh Ayyappanpillai, Thiruvananthapuram (IN); Dipak Patra, Thiruvananthapuram (IN); Sreejith Shankar Pooppanal, Thiruvananthapuram (IN)

(73) Assignee: Council of Scientific and Industrial Research, New Delhi (IN)

( * ) Notice: Subject to any disclaimer, the term of this patent is extended or adjusted under 35 U.S.C. 154(b) by 159 days.

(21) Appl. No.: 18/698,735

(22) PCT Filed: Sep. 23, 2022

(86) PCT No.: PCT/IN2022/050852
§ 371 (c)(1),
(2) Date: Apr. 4, 2024

(87) PCT Pub. No.: WO2023/058048
PCT Pub. Date: Apr. 13, 2023

(65) Prior Publication Data
US 2024/0400898 A1 Dec. 5, 2024

(30) Foreign Application Priority Data
Oct. 4, 2021 (IN) .............................. 202113045339

(51) Int. Cl.
*C09K 11/06* (2006.01)
*C09K 19/06* (2006.01)

(52) U.S. Cl.
CPC ............ *C09K 19/061* (2013.01); *C09K 11/06* (2013.01); *C09K 2219/13* (2013.01)

(58) Field of Classification Search
CPC ... C09K 11/06; C09K 19/061; C09K 2219/13
See application file for complete search history.

(56) References Cited

U.S. PATENT DOCUMENTS 5,430,104 A 7/1995 Siol et al.
9,550,168 B2 1/2017 Gough et al.
(Continued)

FOREIGN PATENT DOCUMENTS

KR 2019-0060304 A 6/2019
WO WO 2015/130012 A1 3/2015
WO WO 2020/097163 A1 5/2020

OTHER PUBLICATIONS

Wei, P. et al. "A Discrete Amphiphilic Organoplatinum(II) Metallacycle with Tunable Lower Critical Solution Temperature Behavior", *Journal of the American Chemical Society* 2014 136 (44), 15497-15500.
(Continued)

*Primary Examiner* — Bijan Ahvazi
(74) *Attorney, Agent, or Firm* — Knobbe, Martens, Olson & Bear, LLP

(57) ABSTRACT

Design and applications of a class of water-soluble small molecules represented by formula 1. The molecules, in their dilute aqueous solutions, exhibit lower critical solution temperature (LCST) phase transitions near room temperature, inducing a temperature triggered switching of opacity. Further, disclosed is a scalable smart window, akin to a radiative energy management system, that can be incorporated into the built environment for imparting energy efficiency. The window fabrication is facile wherein the aque-
(Continued)

ous solution is sandwiched between two transparent glass panes to enable modulation of light and heat transmission. The dynamic window of present invention represents with multifarious applications in developing scalable, smart energy management systems for indoor building environments is envisioned to be a major contribution towards cost effective smart glass technologies.

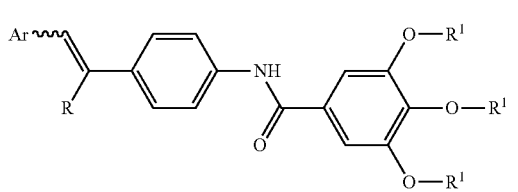

1

20 Claims, 12 Drawing Sheets

(56) References Cited

U.S. PATENT DOCUMENTS

| | | | | |
|---|---|---|---|---|
| 2015/0299563 | A1* | 10/2015 | Ayyappanpillai | B42D 25/415 427/7 |
| 2023/0028718 | A1* | 1/2023 | Ayyappanpillai | E06B 3/6722 |

OTHER PUBLICATIONS

Richards, G.J. et al. Designing Lower Critical Solution Temperature Behavior into a Discotic Small Molecule, *The Journal of Physical Chemistry Letters* 2010 1 (9), 1336-1340.

Zhu, Y. et al. "Design of Thermoresponsive Polymers with Aqueous LCST, UCST, or Both: Modification of a Reactive Poly(2-vinyl-4,4-dimethylazlactone) Scaffold", *Macromolecules* 2016 49 (2), 672-680.

Lee, S. et al. "Nonpolymeric Thermosensitive Benzenetricarboxamides", *Langmuir* 2011 27 (5), 1560-1564.

Betancourt, J.E. et al. "Nonpolymeric Thermosensitive Supramolecules", *Journal of the American Chemical Society* 2009 131 (46), 16666-16668.

Higashiguchi, K. et al. "Photoinduced Macroscopic Morphological Transformation of an Amphiphilic Diarylethene Assembly: Reversible Dynamic Motion", *Journal of the American Chemical Society* 2015 137 (7), 2722-2729.

Gohy, J.-F. and Zhao, Y. "Photo-responsive block copolymer micelles: design and behavior", *Chemical Society Reviews* 2013 (42) 7117-7129.

Ogoshi, T. et al. "Photoreversible Switching of the Lower Critical SolutionTemperature in a Photoresponsive Host-Guest System of Pillar[6]arene with Triethylene Oxide Substituents and an Azobenzene Derivative", *Journal of the American Chemical Society* 2012 134 (49), 20146-20150.

Shild, H.G. "Poly(N-Isopropylacrylamide): Experiment, Theory and Application", *Prog. Polym. Sci.* 1992 vol. 17, 163-249.

Lubtow, M. et al. "Self-Assembly of 9,10-Bis(phenylethynyl) Anthracene (BPEA) Derivatives: Influence of π-π and Hydrogen-Bonding Interactions on Aggregate Morphology and Self-Assembly Mechanism", *Chemistry—A European Journal* 2017 23 (25), 6198-6205.

Hirose, T, et al. "Self-Assembly of Photochromic Diarylethenes with Amphiphilic Side Chains: Reversible Thermal and Photochemical Control", *The Journal of Organic Chemistry* 2006 71 (20), 7499-7508.

De La Rosa, V. R et al. "Supramolecular control over thermoresponsive polymers", *Materials Today* 2015 44-55.

Das, S. et al. "Supramolecular Gel Phase Controlled [4+2] Diels-Alder Photocycloaddition for Electroplex Mediated White Electroluminescence", *Journal of the American Chemical Society* 2019 141 (14), 5635-5639.

Aathimanikandan, S.V. et al. "Temperature-Sensitive Dendritic Micelles", *Journal of the American Chemical Society* 2005 127 (42), 14922-14929.

Fuller, J.M. et al. "Temperature-Sensitive Transitions below LCST in Amphiphilic Dendritic Assemblies: Host-Guest Implications", *Journal of the American Chemical Society* 2013 135 (24), 8947-8954.

Peng, H.-Q. et al. "Visualizing the Initial Step of Self-Assembly and the Phase Transition by Stereogenic Amphiphiles with Aggregation-Induced Emission", *ACS Nano* 2019 13 (1), 839-846.

International Search Report for PCT Application No. PCT/IN2022/050852 dated Jan. 18, 2023, in 3 pages.

Written Opinion for PCT Application No. PCT/IN2022/050852 dated Jan. 18, 2023, in 4 pages.

* cited by examiner

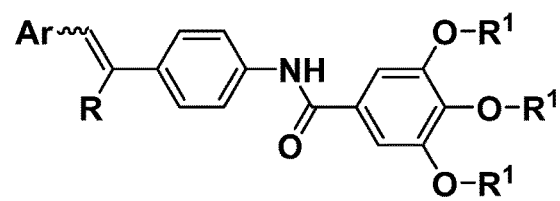
Figure: 1
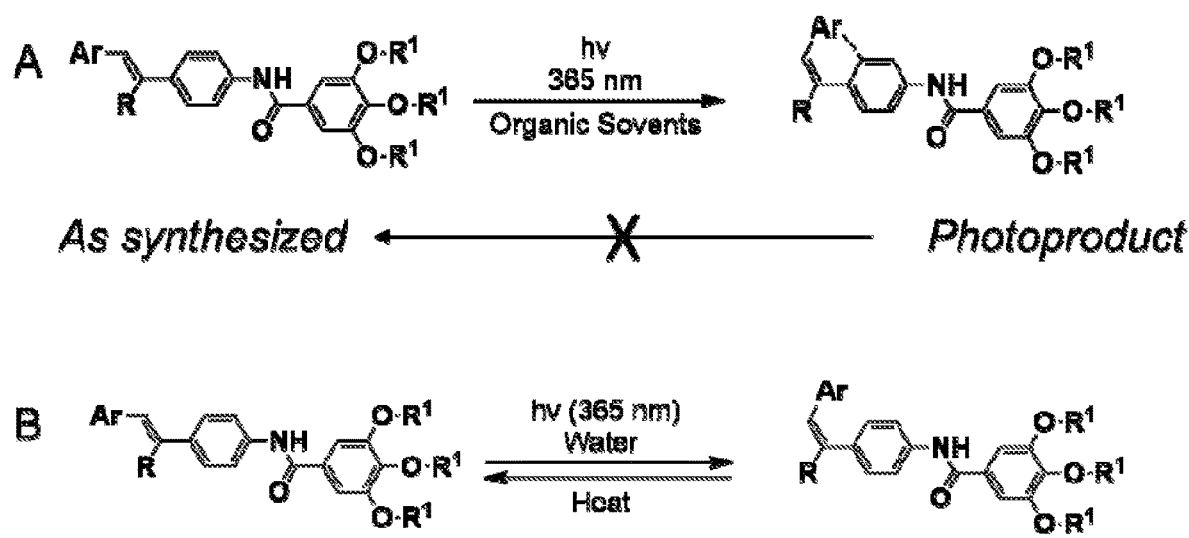
Figure: 2

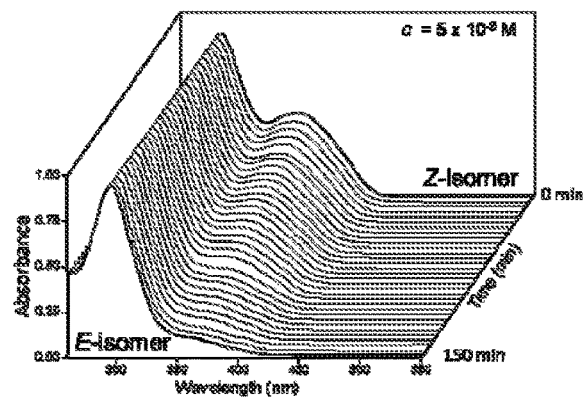
Figure: 3
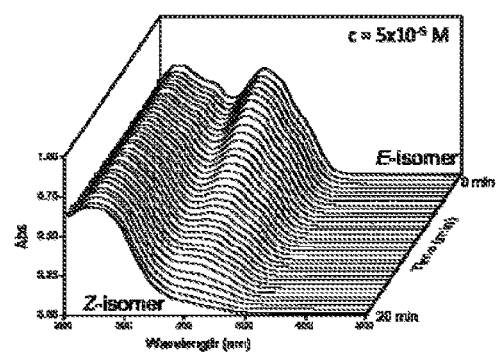
Figure: 4
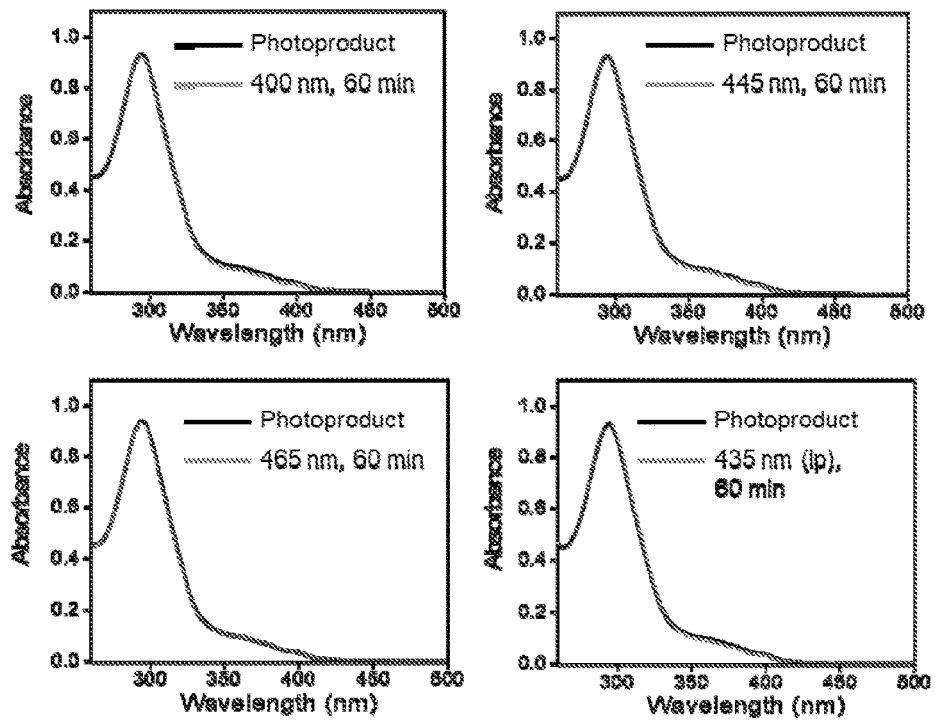
Figure: 5

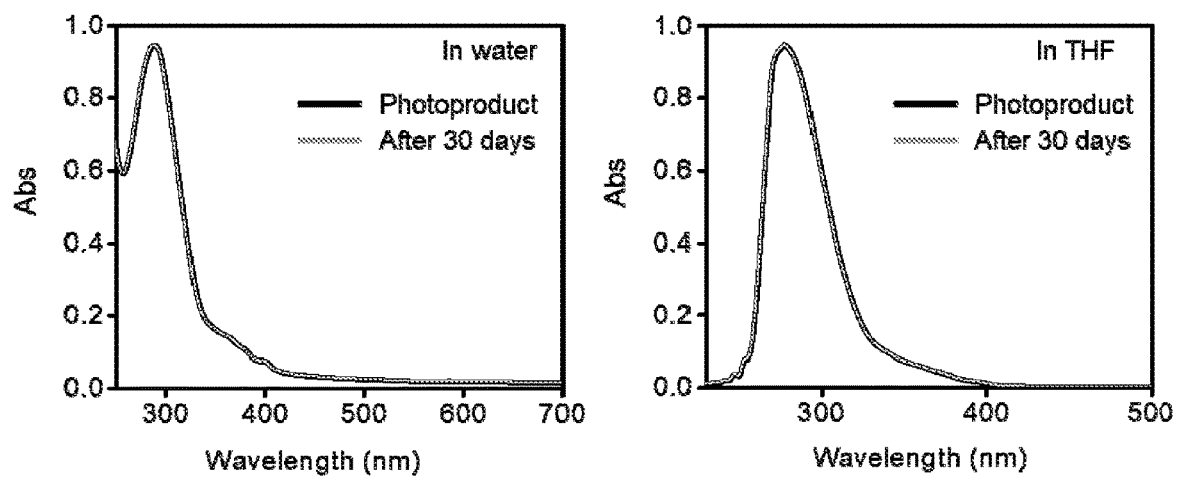
Figure: 6
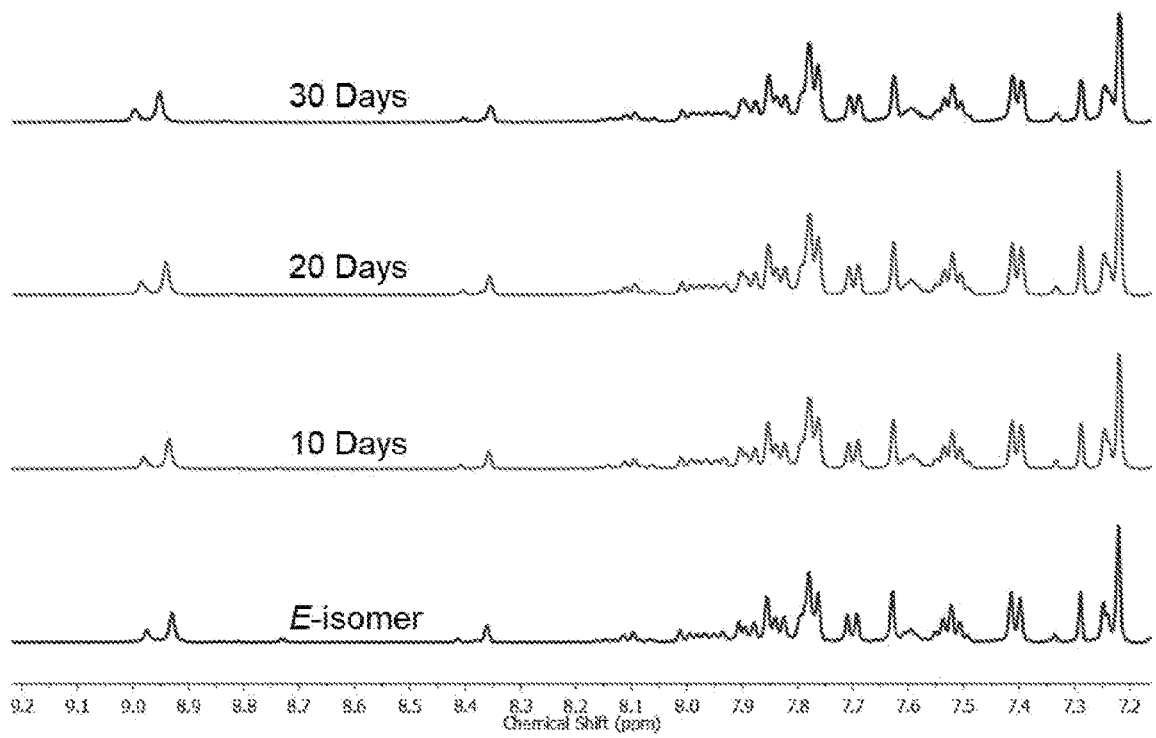
Figure: 7

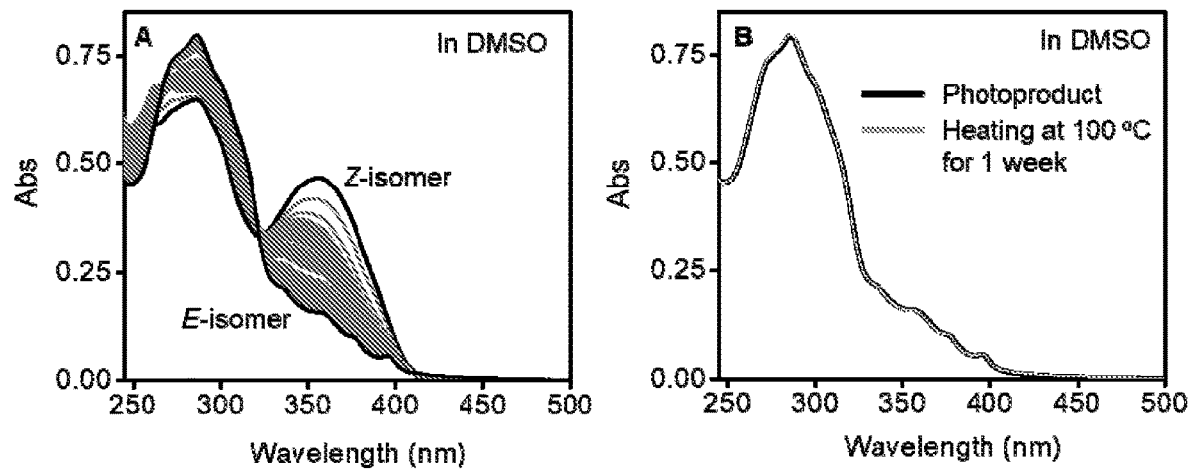
Figure: 8
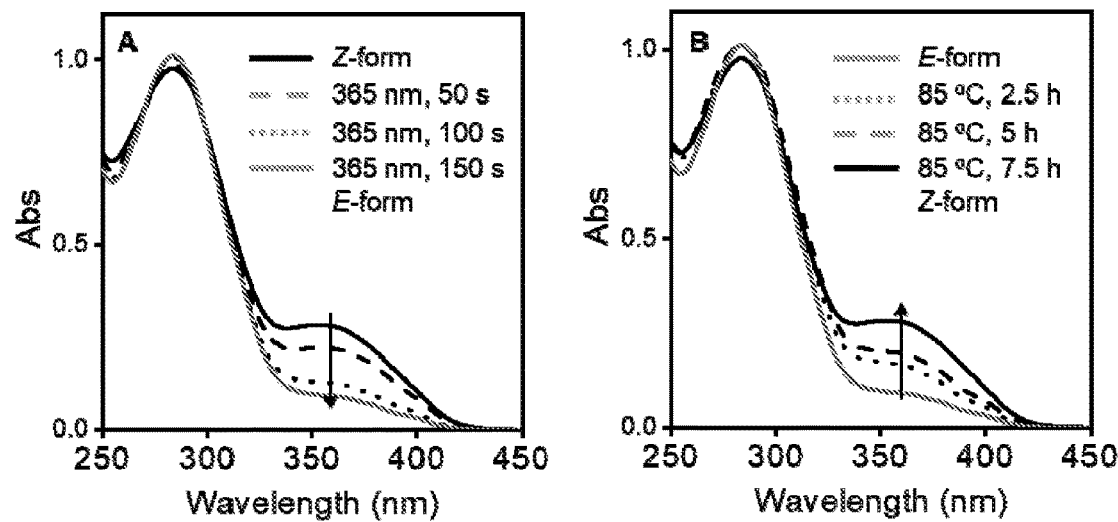
Figure: 9

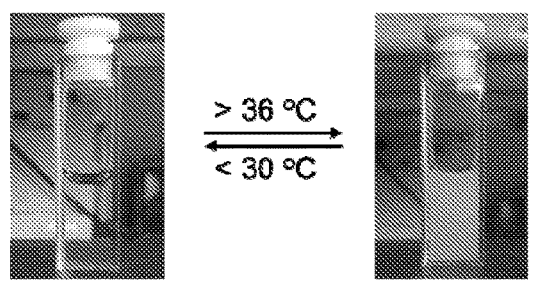 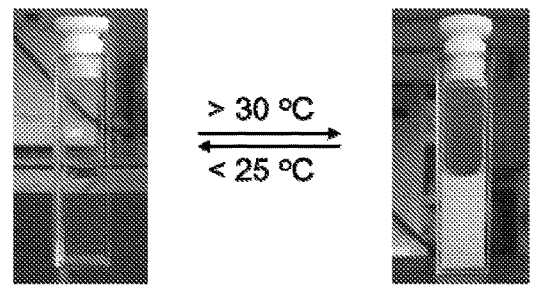
Figure: 10                                                                 Figure: 11
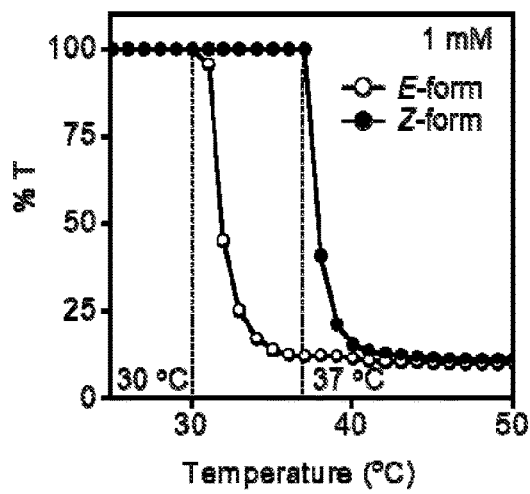 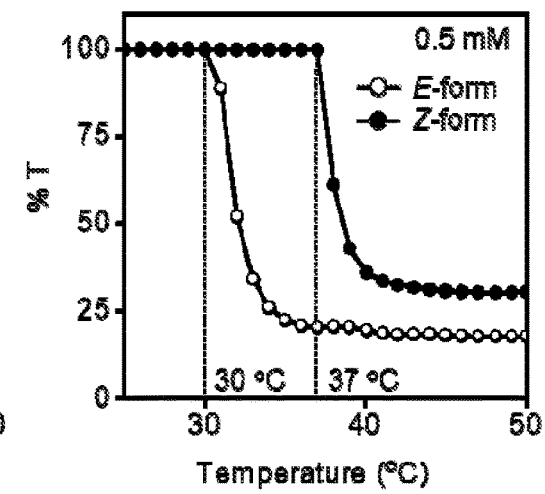
Figure: 12

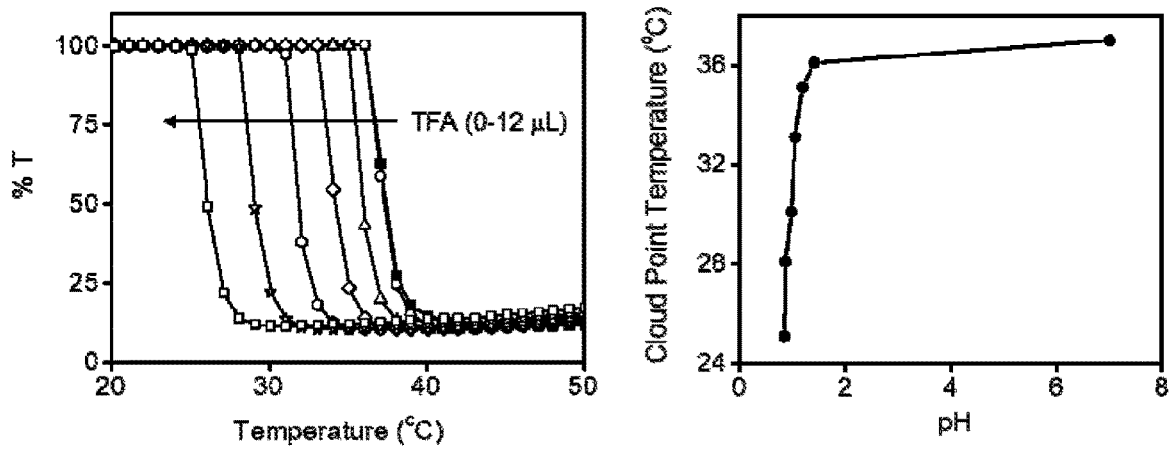
Figure: 13
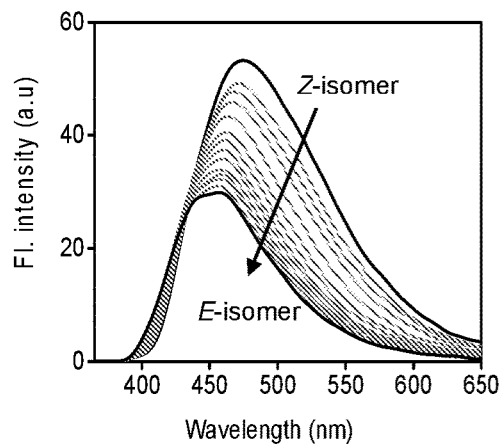
Figure: 14
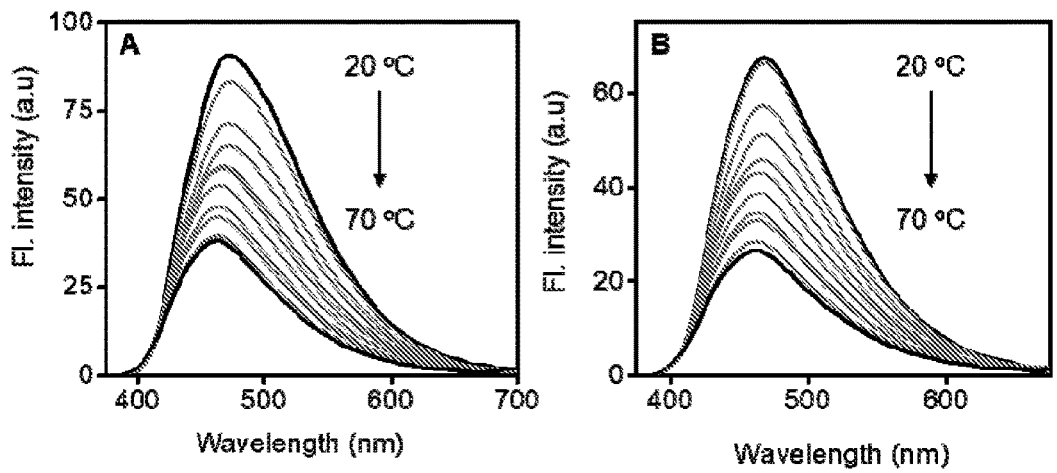
Figure: 15

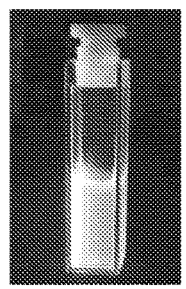 ⇌ 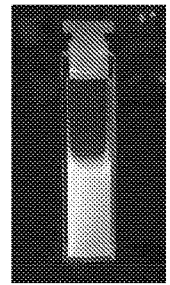
> 36 °C / < 30 °C
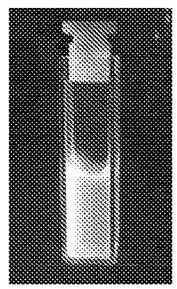 ⇌ 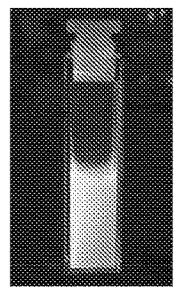
> 30 °C / < 25 °C
Figure: 16
Figure: 17
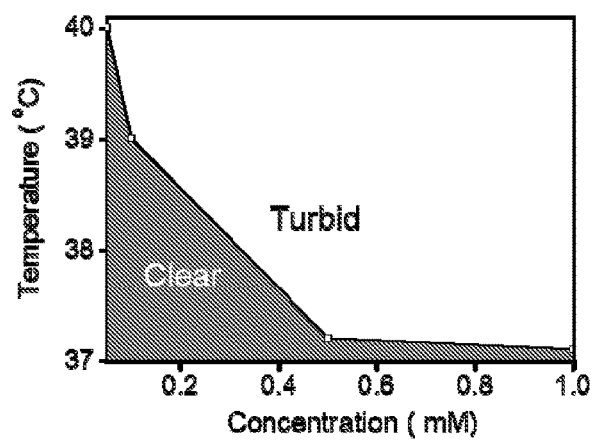
Figure: 18
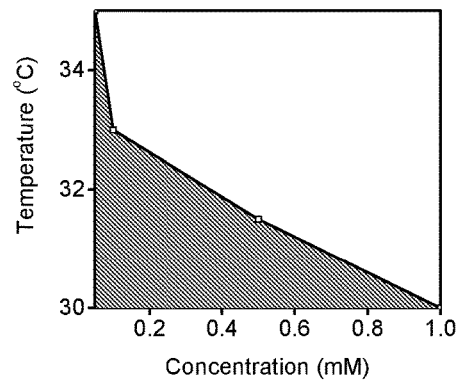
Figure: 19

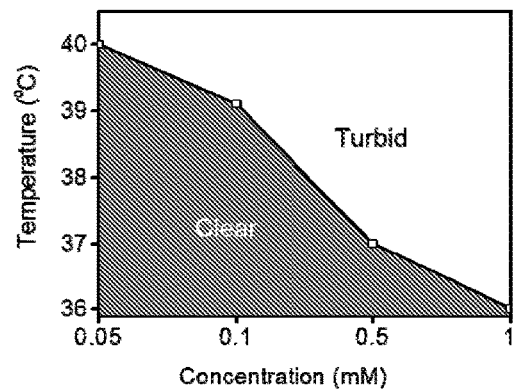
Figure: 20
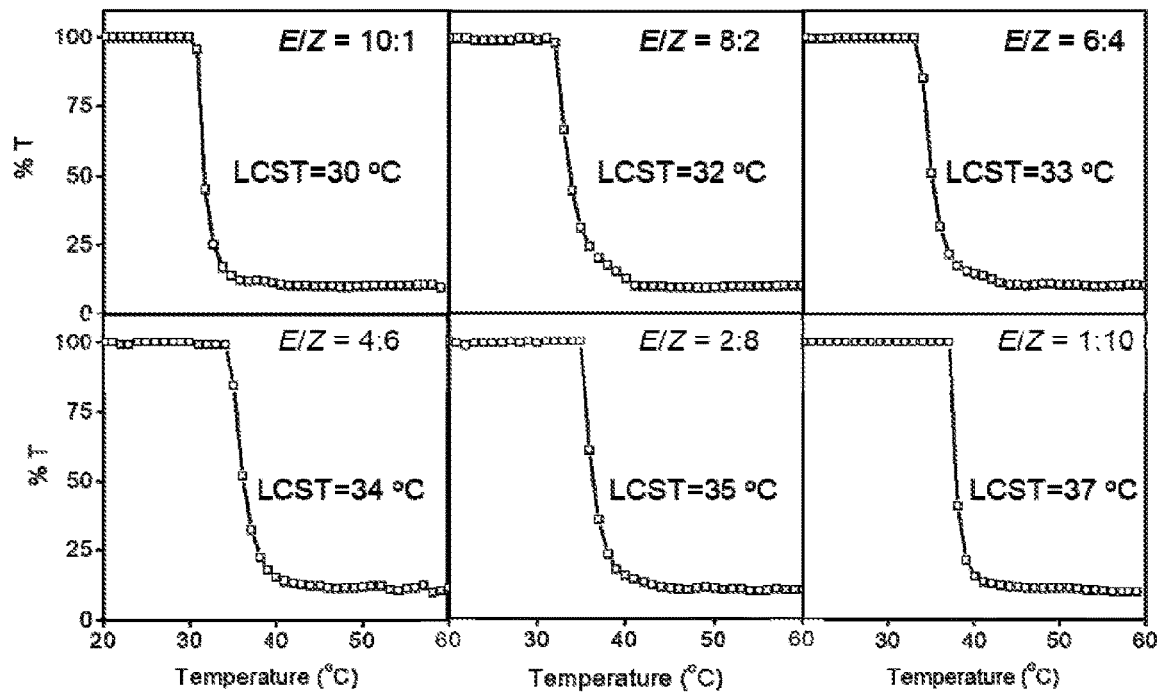
Figure: 21

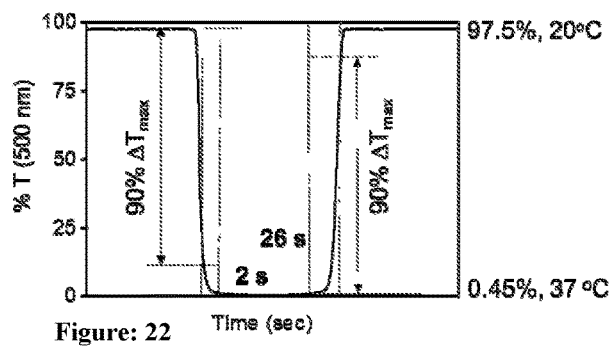
Figure: 22
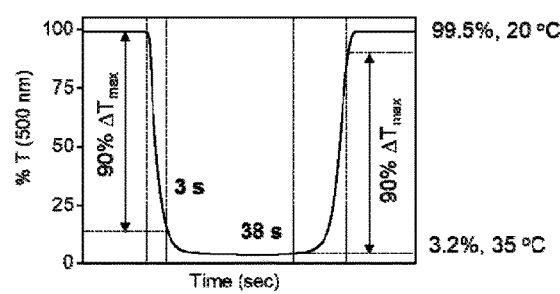
Figure: 23
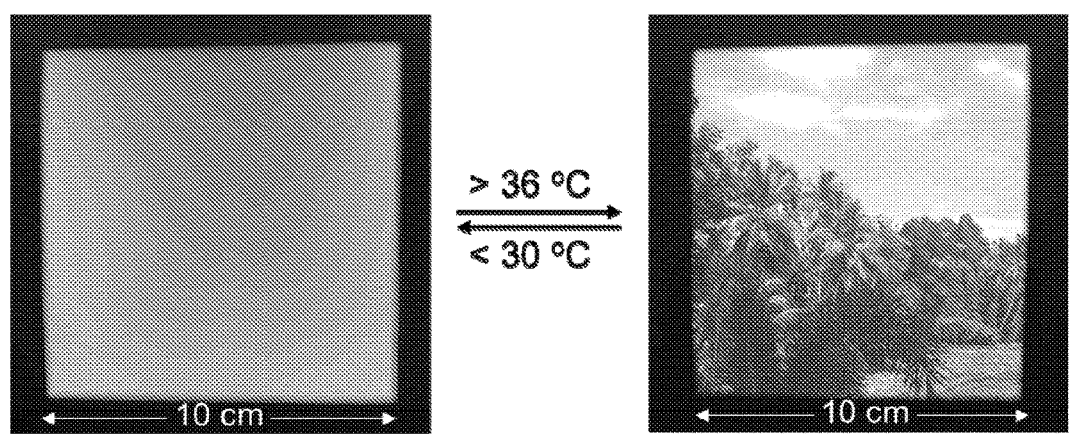
Figure: 24

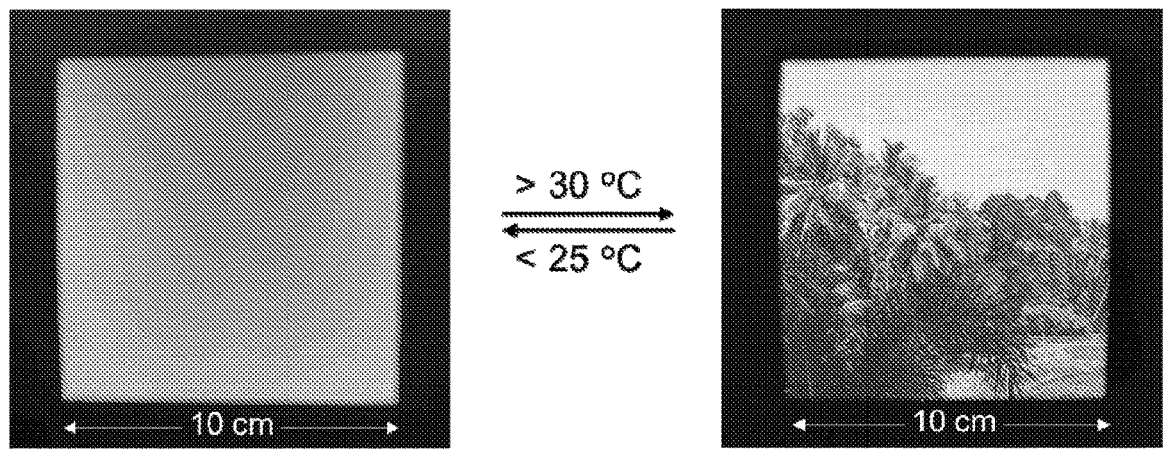
Figure: 25
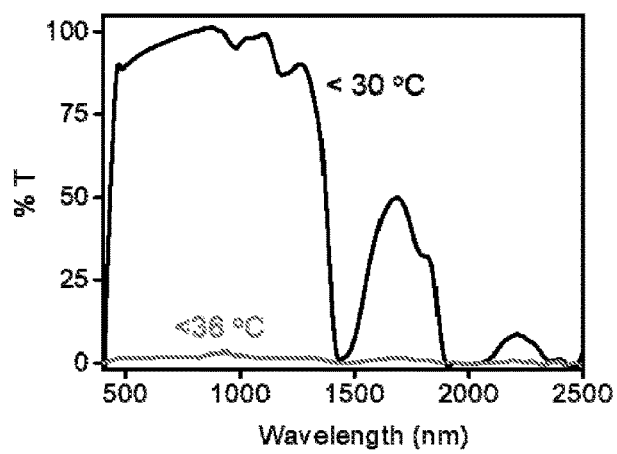
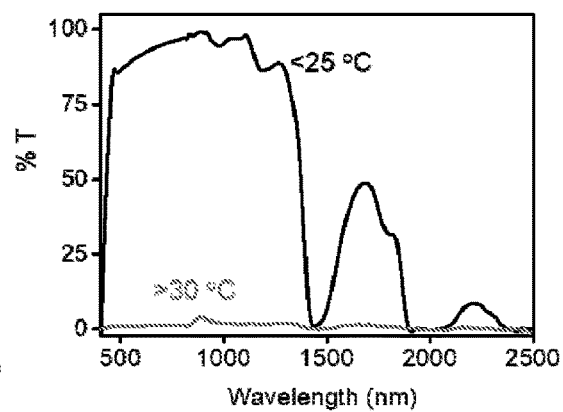
Figure: 26                                    Figure: 27

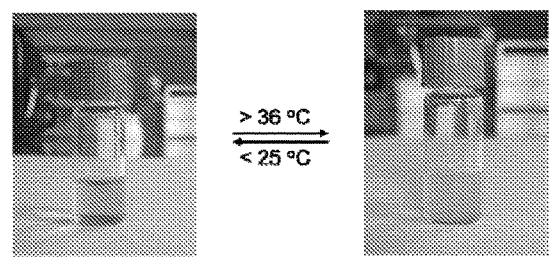
Figure: 28
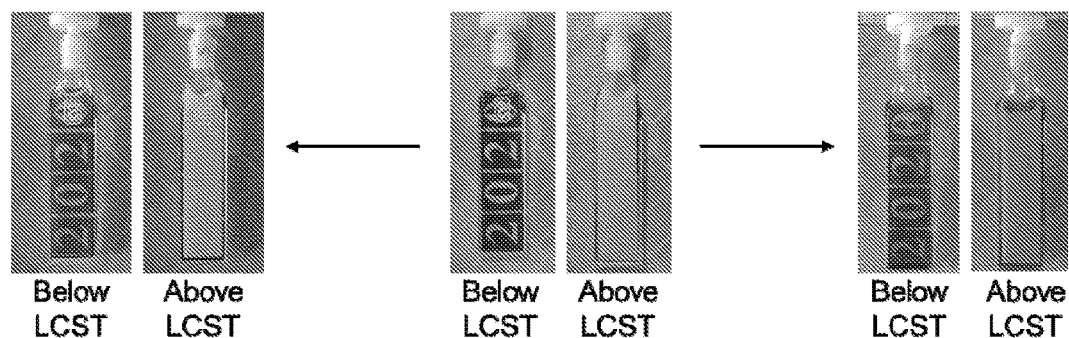
Figure: 29
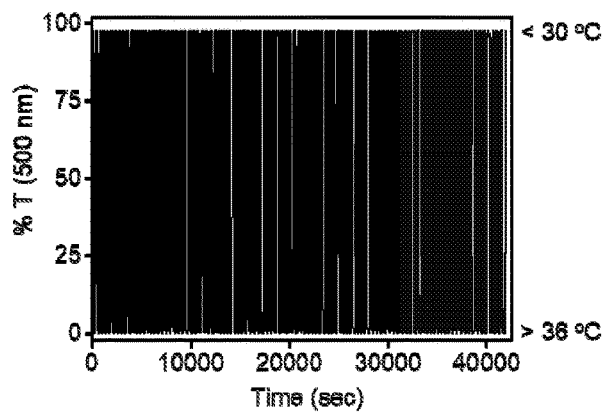
Figure: 30
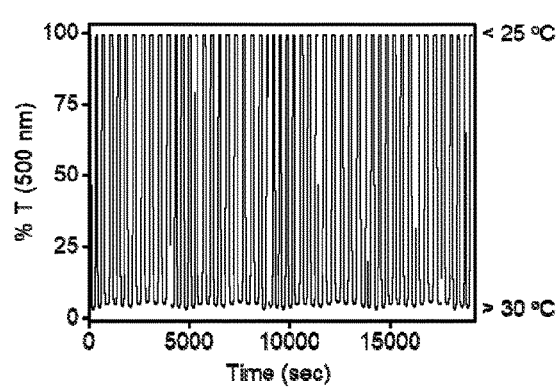
Figure: 31

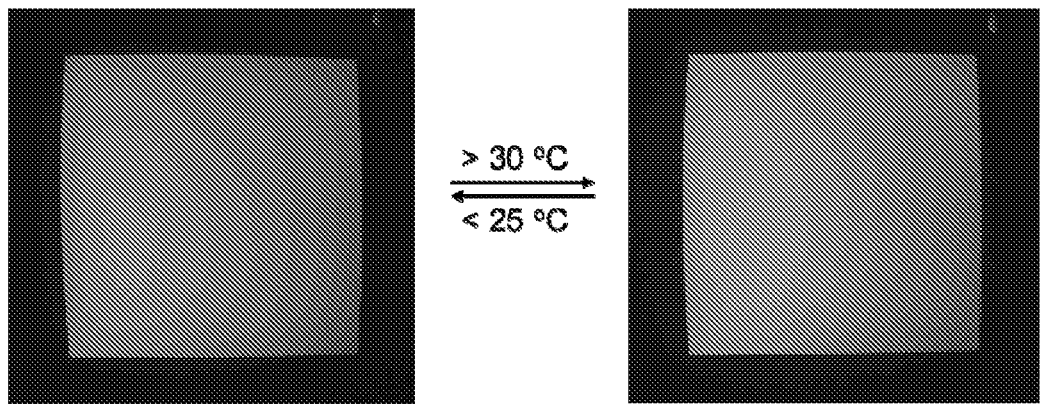
Figure: 32
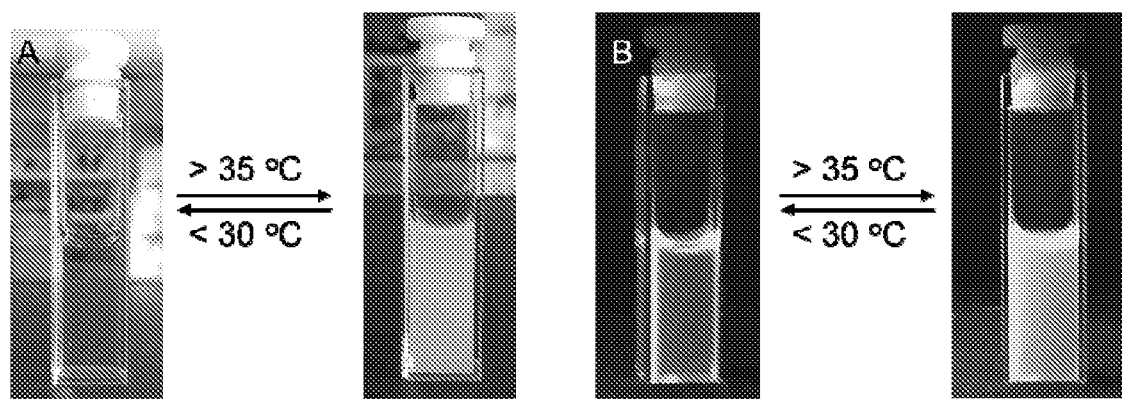
Figure: 33

TEMPERATURE PROGRAMMABLE SMALL MOLECULES FOR THERMORESPONSIVE SMART WINDOWS AND APPLICATIONS THEREOF

FIELD OF THE INVENTION

The present invention relates to the development and applications of novel thermo-responsive molecules of general formula 1 as set forth hereinafter. In particular, the invention relates to dynamic windows fabricated by sandwiching a solution of desired concentration of the said molecules of formula 1 between two glass panes whereby based on temperature stimuli, the window changes its transparency. The response temperature and time of these thermos-responsive systems are modulated using various physico-chemical parameters. With simple and economical starting materials, the dynamic windows of the present invention represent leaps towards creating a niche technology with multifarious applications in developing scalable, smart energy management systems for indoor building environments.

BACKGROUND AND PRIOR ART OF THE INVENTION

Responsive materials exhibiting controllable light and heat transmission properties are of tremendous interest, especially for the realization of energy-efficient buildings. A large number of research articles and patents cover this area, however, most majority of these reports and documents deal with materials or systems that are responsive at a higher expense of energy input in the form of electricity, heat, etc. Accordingly, there are several classes of responsive materials, where the stimulus responsible for the change in properties are electricity (electrochromic materials), temperature (thermochromic materials), etc. A dynamic system of this nature that switches its opacity/transparency at temperatures near ambient temperature (25-30° C.), without the need for additional energy input, are rarely reported.

In this context, materials exhibiting lower critical solution temperature (LCST) behavior are of particular interest. These materials in their solutions switch between transparent and opaque phases below and above the critical temperature respectively (Reference may be made to Hoogenboom et al. Supramolecular Control over Thermoresponsive Polymers. *Materials Today* 2016, 19, 44-55). In general, solutions of materials exhibiting LCST behaviour are opaque above and transparent below the critical temperature.

Hydrophilic acrylamide-based polymers and co-polymers such as NIPAM undergo phase transition or change in their size or volume upon increasing the temperature beyond LCST (Reference may be made to Schild, Poly(N-isopropylacrylamide): experiment, theory and application *Polym. Sci.* 1992, 17, 163).

While several polymers have been shown to exhibit LCST behavior, small molecule-based LCST systems are rare. However, LCST behavior has been recently reported in large molecular systems such as discotic molecules (Reference may be made to Richards, et al. Designing Lower Critical Solution Temperature Behavior into a Discotic Small Molecule *J. Phys. Chem. Lett.,* 2010, 1, 1336-1340), dendrimers (Reference may be made to Aathimanikandan, et al. Savariar, E. N.; Thayumanavan S. Temperature-Sensitive Dendritic Micelles. *J. Am. Chem. Soc.,* 2005, 127, 14922-14929; Fuller, et al. Temperature-Sensitive Transitions below LCST in Amphiphilic Dendritic Assemblies: Host-Guest Implications. *J. Am. Chem. Soc.* 2013, 135, 8947-8954), supramolecular assemblies (Reference may be made to Lee, S.; Lee, et al. Nonpolymeric Thermosensitive Benzenetricarboxamides. *Langmuir* 2011, 27, 1560-1564; Hirose, et al. Self-Assembly of Photochromic Diarylethenes with Amphiphilic Side Chains: Reversible Thermal and Photochemical Control. *J. Org. Chem.* 2006, 71, 7499-7508; Betancourt, et al. Nonpolymeric Thermo-sensitive Supramolecules. *J. Am. Chem. Soc.* 2009, 131, 16666-16668), host-guest complexes (Reference may be made to Ogoshi, et al. Photoreversible Switching of the Lower Critical Solution Temperature in a Photoresponsive Host-Guest System of Pillar[6]arene with Triethylene Oxide Substituents and an Azobenzene Derivative. *J. Am. Chem. Soc.* 2012, 134, 20146-20150) and metallocycles (Reference may be made to Wei, et al. A Discrete Amphiphilic Organoplatinum(II) Metallacycle with Tunable Lower Critical Solution Temperature Behavior *J. Am. Chem. Soc.* 2014, 136, 15497-15500).

Photoresponsive polymers having LCST phase behavior have also been reported in the literature (Reference may be made to Gohy, et al. Photo-responsive block copolymer micelles: design and behavior Chem. *Soc. Rev.,* 2013, 42, 7117-7129).

LCST is a comparably common phenomenon in polymers and large-molecule assemblies. However, small molecules derived LCST systems are not frequently found in the literature (Reference may be made to Peng, et al. Visualizing the Initial Step of Self-Assembly and the Phase Transition by Stereogenic Amphiphiles with Aggregation-Induced Emission. *ACS Nano,* 2019, 13, 839-846; Higashiguchi, et al. Photoinduced Macroscopic Morphological Transformation of an Amphiphilic Diarylethene Assembly: Reversible Dynamic Motion. *J. Am. Chem. Soc.* 2015, 137, 2722-2729).

A supramolecular cycloadduct of 9-phenylethynylanthracene has been shown to exhibit electroplex mediated white light emission (Reference may be made to Das, et al. Supramolecular Gel Phase Controlled [4+2] Diels-Alder Photocycloaddition for Electroplex Mediated White Electroluminescence. *J. Am. Chem. Soc.* 2019, 141, 5635-5639). However, the system under reference did not exhibit any LCST or thermo-responsive behaviour.

Self assembling properties and mechanisms have also been reported for molecules belonging to 9,10-Bis(phenylethynyl) anthracene derivatives (reference may be made to Lubtow et al. Self-Assembly of 9,10-Bis(phenylethynyl) Anthracene (BPEA) Derivatives: Influence of π-π and Hydrogen-Bonding Interactions on Aggregate Morphology and Self-Assembly Mechanism Chem. Eur. J. 2017, 23, 6198-6205). However, these molecules were not explored towards their LCST properties or thermo-responsive behaviour.

Several patents and patent applications also disclose the phenomenon of LCST in polymeric systems. KR 2019060304A (Reference may be made to Lee, et al. Thermotrophic composition for smart window for controlling phase transition temperature Repub. Korean Kongkae Taeho Kongbo, KR 2019060304A, 2019) has disclosed a smart window thermotrophic composition by adjusting the LCST properties of N-iso-Pr acrylamide, N,N-methylenebis(acrylamide), ammonium persulfate and N,N,N,N-tetramethylethylenediamine in water-glycol mixture for improving energy efficiency. The LCST temperature was regulated by controlling the amount of glycol in deionized water.

U.S. Pat. No. 5,430,104A (Siol et al., Polymer Mixtures with Lower Critical Solution Temperature (LCST) Behavior, U.S. Pat. No. 5,430,104 A, 1995) proposed a blend of two different polymer mixtures, poly-α-methylstyrene (PAMs) and polyvinyl methyl ether (PVMe) as materials with a sharp temperature-dependent optical permeability.

A thermally programmable co-polymer system consisting of poly(N-isopropylacrylamide), poly(N-ethylacrylamide) or poly(N,N-dimethylacryl amide) was disclosed by U.S. Pat. No. 9,550,168 B2 (Reference may be made to van Gough, et al. Programmable pH Buffers, U.S. Pat. No. 9,550,168 B2, 2017) to exhibit low temperature LCST behavior leading to a hydrophobic-to-hydrophilic phase change, wherein the acid-base properties of the said system was found to be responsive to the said phase change. The claimed application involves the sequestration of gaseous $CO_2$.

WO 2015130012 A1 (Reference may be made to Yoon, at al. Smart Window Comprising Temperature-Sensitive Hydrogel Containing Photothermal Conversion Material and Method for Manufacturing the Same, WO 2015130012 A1, 2015) disclosed a temperature-dependent smart window comprising a thermo-responsive hydrogel. The smart window changed its transparency in response to temperature exposure, near its cloud point corroborating the LCST behavior.

Thus, based on above, the prior art lacks small molecules exhibiting LCST behavior at ambient temperature, specifically in the range of 25-30° C., or ambient environment of 20-40° C., 1 atmospheric pressure and 0-95% relative humidity, though they are of high commercial significance.

OBJECTIVES OF THE INVENTION

The primary objective of the present invention relates to the design and synthesis of water soluble small organic molecules of general formula 1.

Another objective is to utilize the lower critical solution temperature (LCST) phase transition of aqueous solutions of molecules of general formula 1 to impart a temperature triggered switching of transparent and opaque states at near room temperature.

Another objective is to program and fine-tune the response temperature, switching time, chemical transformation, light response and solar/IR/luminous transmittance as a function of a secondary stimulus like light, chemical additives, etc.

Yet another objective of the present invention is to fabricate a scalable smart radiative energy management system in the form of a smart window that can be incorporated into a built environment for imparting energy efficiency, apart from ensuring need-based privacy via an opaque absolute public state and a transparent absolute private state, with the possibilities to modulate transparency in between these states.

SUMMARY OF THE INVENTION

The prime aspect of the present invention relates to molecules of general formula 1

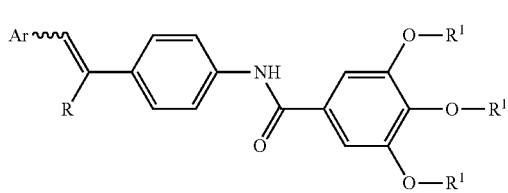

wherein,
$R_1$ is selected from $[(CH_2)_a—O]_b—CH_3$ wherein, a is an integer a=1 or 2, b is an integer b=2-20;
R is independently selected from H, CN, or halogens; and
Ar is an aryl group, wherein the said aryl group comprises of single or multiple fused rings, the number of rings is 1-5 (benzene to pentacene) and azulene, the said aryl groups may be optionally substituted with halogen, OH, —CN, —O(C1-C30 alkyl chain), —(NH)$_{1-2}$(C$_1$-C$_{30}$ alkyl chain), —N((C$_1$-C$_{30}$ alkyl chain))$_2$, —COOH, —COO(C$_1$-C$_{300}$ alkyl chain).

Another aspect of the present invention discloses the molecules of general formula 1 that exhibit thermo-responsive behaviour, wherein the said molecules in their dilute aqueous solutions exhibit near room temperature LCST (lower critical solution temperature) phase transition.

Another embodiment of the present invention related to the said thermo-responsive solutions is to able to modulate light and heat transmission via reversible switching of optical transparency around the LCST.

Yet another aspect of the present invention identifies the modulation of the cloud point temperature (LCST) via light irradiation, changes in pH, concentration or ratio of the corresponding isomeric forms.

In yet another embodiment of the present invention, the design and fabrication of dynamic windows by sandwiching the aqueous solution of the thermo-responsive molecules of general formula 1 between two glass panes thereby allowing tunability of transparency and hence heat and light transmission via controlled LCST phase transitions triggered by controlled temperature exposure, preferably at temperatures near room temperature, more preferably in a range of 20° C.-45° C., is disclosed.

Another embodiment the present invention relates to the dynamic windows fabricated as above with color tunability and emissive properties for efficient management and utilization of energy in a built indoor environment or for ensuring need based privacy.

BRIEF DESCRIPTION OF THE DRAWINGS

FIG. 1 illustrates the chemical structure of the molecules with general formula 1.

FIG. 2 illustrates the scheme depicting (A) one-way photoisomerization of the molecules with general formula 1 upon irradiation with light of 356 nm in organic solvents and (B) thermally reversible photoisomerization in water.

FIG. 3 illustrates the UV-Vis spectra of one-way photoisomerization of the molecule with general formula 1 upon irradiation with light of 356 nm. The structure of the molecule is provided in Example 5.

FIG. 4 illustrates the UV-Vis spectra of one-way photoisomerization of the molecule with general formula 1 upon irradiation with light of 356 nm. The chemical structure of the molecule is given in Example 5.

FIG. 5 illustrates the photostability of the E-isomer of a molecule of general formula 1 under various light irradiation conditions, confirming a one-way photoreaction in organic solvents (Acetonitrile, Methanol, DMSO). The structure of the molecule is provided in Example 5.

FIG. 6 illustrates the ambient stability of the E-isomer (water) and photoproduct (THF) of a molecule of general formula 1 under room light at room temperature. The structure of the molecule is provided in Example 5.

FIG. 7 illustrates the thermal stability (65° C.) of the E-isomer confirming a one-way photoreaction in acetonitrile. The structure of the molecule is provided in Example 5.

FIG. 8 illustrates the photoreaction of the Z-isomer of a molecule of general formula 1 in DMSO under 365 nm irradiation (A) and the stability of the photoproduct under thermal conditions (100° C.), confirming a one-way photoreaction (B). The chemical structure of the molecule is shown in Example 5.

FIG. 9 illustrates the thermally reversible photoisomerization of the Z-isomer of a molecule of general formula 1 to the E-isomer in water (A) under 365 nm irradiation and (B) thermal back-isomerization. Arrows represent the direction of changes in absorbance. The structure of the molecule is provided in Example 5.

FIG. 10 illustrates the LCST based transparency changes for an aqueous solution of the Z-isomer of a molecule of general formula 1. The chemical structure of the molecule is shown in Example 5.

FIG. 11 illustrates the LCST based transparency changes for an aqueous solution of the E-isomer of a molecule of general formula 1. The chemical structure of the molecule is shown in Example 5.

FIG. 12 illustrates the lower cloud point temperature (LCST) for an aqueous solution of the E-isomer as compared to the Z-form of a molecule of general formula 1 at any non-limiting concentration in water. The chemical structure of the molecule is shown in Example 5.

FIG. 13 illustrates the pH dependence of cloud point temperature (LCST) for an aqueous solution of a molecule of general formula 1. The pH was varied by the addition of different amounts of trifluoroacetic acid and the cloud point temperature (LCST) increased with increasing pH. The chemical structure of the molecule is shown in Example 5.

FIG. 14 illustrates the modulation of fluorescence intensity via light irradiation of an aqueous solution of a molecule of general formula 1. 365 nm light was used for converting the Z-isomer to the E-isomer. The chemical structure of the molecule is shown in Example 5.

FIG. 15 illustrates the modulation of fluorescence intensity via changes in temperature for an aqueous solution of a molecule of general formula 1: (A) Z-isomer and (B) E-isomer. The chemical structure of the molecule is shown in Example 5.

FIG. 16 illustrates the decrease in fluorescence emission accompanying the LCST based transparency changes for an aqueous solution of the Z-isomer of a molecule of general formula 1. The chemical structure of the molecule is shown in Example 5.

FIG. 17 illustrates the decrease in fluorescence emission accompanying the LCST based transparency changes for an aqueous solution of the E-isomer of a molecule of general formula 1. The chemical structure of the molecule is shown in Example 5.

FIG. 18 illustrates the concentration-dependent variations in the cloud point temperature for the Z-isomer of the molecule of general formula 1. The chemical structure of the molecule is shown in Example 5.

FIG. 19 illustrates the concentration-dependent variations in the cloud point temperature for the E-isomer of the molecule of general formula 1. The chemical structure of the molecule is shown in Example 5.

FIG. 20 illustrates the concentration-dependent variations in the cloud point temperature for a molecule of general formula 1. The chemical structure of the molecule is shown in Example 10.

FIG. 21 illustrates the controlled variations in the cloud point temperature (LCST) with changing ratios of the E and Z-isomers of the molecule of general formula 1. The chemical structure of the molecule is shown in Example 5.

FIG. 22 illustrates the response time for an aqueous solution (1 mM) of the Z-isomer of the molecule of general formula 1. The chemical structure of the molecule is shown in Example 5.

FIG. 23 illustrates the response time for an aqueous solution (1 mM) of the E-isomer of the molecule of general formula 1. The chemical structure of the molecule is shown in Example 5.

FIG. 24 illustrates the dynamic window prototype constructed from the Z-isomer of the molecule of general formula 1 as its solution in water. The chemical structure of the molecule is shown in Example 5.

FIG. 25 illustrates the dynamic window prototype constructed from the E-isomer of the molecule of general formula 1 as its solution in water. The chemical structure of the molecule is shown in Example 5.

FIG. 26 illustrates the light transmittance (NIR-Vis) of the dynamic window prototype constructed from the Z-isomer of the molecule of general formula 1 as its solution in water above and below its cloud point temperature (LCST). The chemical structure of the molecule is shown in Example 5.

FIG. 27 illustrates the light transmittance (NIR-Vis) of the dynamic window prototype constructed from the E-isomer of the molecule of general formula 1 as its solution in water above and below its cloud point temperature (LCST). The chemical structure of the molecule is shown in Example 5.

FIG. 28 illustrates the LCST based transparency changes for an aqueous solution of a molecule of general formula 1. The chemical structure of the molecule is shown in Example 10.

FIG. 29 illustrates the colour tunability of a solution of molecule of general formula 1 by the addition of water-soluble dyes. The chemical structure of the molecule is shown in Example 5.

FIG. 30 illustrates the transparent-opaque switching stability of a solution of the Z-isomer of the molecule of general formula 1 below and above its cloud point temperature. The chemical structure of the molecule is shown in Example 5.

FIG. 31 illustrates the transparent-opaque switching stability of a solution of the E-isomer of the molecule of general formula 1 below and above its cloud point temperature. The chemical structure of the molecule is shown in Example 5.

FIG. 32 illustrates the emissive prototypes of the dynamic windows. The chemical structure of the molecule is shown in Example 5.

FIG. 33 illustrates the LCST based (A) transparency and (B) emission changes for an aqueous solution of a molecule of general formula 1. The chemical structure of the molecule is shown in Example 15.

DETAILED DESCRIPTION OF THE INVENTION

This section describes the present invention in preferred embodiments in detail.

The present invention relates to the design and synthesis of a class of molecules or compounds with general formula 1, and their aqueous solutions that change their opacity depending on the applied/environmental temperature, a property known as LCST (lower critical solution temperature).

The dilute aqueous solutions turn opaque above their LCST temperature and attain transparency below the said critical temperature.

In the prime aspect, the present invention relates to molecules of general formula 1

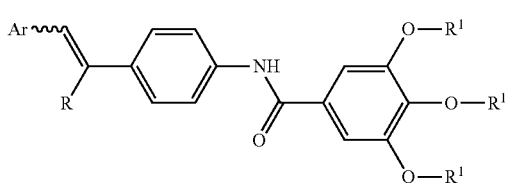

wherein, $R_1$ is selected from $[(CH_2)_a—O]_b—CH_3$ wherein, a is an integer a=1 or 2, b is an integer b=2-20;

R is independently selected from H, CN, or halogens; and

Ar is an aryl group, wherein the said aryl group comprises of single or multiple fused rings, the number of rings is 1-5 (benzene to pentacene) and azulene, the said aryl groups may be optionally substituted with halogen, OH, —CN, —O($C_1$-$C_{30}$ alkyl chain), —$(NH)_{1-2}$($C_1$-$C_{30}$ alkyl chain), —N(($C_1$-$C_{30}$ alkyl chain))$_2$, —COOH, —COO($C_1$-$C_{30}$ alkyl chain).

In a further aspect, the present invention provides a class of thermo-responsive molecules of general formula 1, and their dilute aqueous solutions exhibit near room temperature LCST (lower critical solution temperature) phase transition. These solutions are able to modulate light and heat transmission via reversible switching of optical transparency. LCST, referred to as the lower critical solution temperature, is defined as that critical temperature below which the components are completely miscible for mixture at all possible compositions. Partial or no miscibility above LCST results in increasing opacity. The terms opacity and transparency mentioned hereafter refer to quantified absorption/transmission of light through the solution of such systems, the said light being ambient or produced from a source at the time of interest.

Yet another aspect of the present invention intends to disclose the design and fabrication of dynamic windows by sandwiching the aqueous solution of the said thermo-responsive molecules of general formula 1 between two glass panes. LCST phase transitions triggered by controlled temperature exposure, preferably at temperatures near room temperature, more preferably in a range of 20° C.-45° C., allows tunability of transparency/opacity between a colorless transparent state and a white opaque state, thereby modulating heat and light transmission for energy efficiency in the indoor environment or for ensuring need based privacy.

Sandwiching the above aqueous solutions between two glass panes renders a colorless light transmission mode and an opaque white shade with almost complete blockage of light above the LCST temperature. A dynamic window fabricated from the said solutions, wherein the sandwiched solution is transparent to the naked eye below LCST temperature and opaque above LCST temperature, provides a switching system between clear transparent and opaque white, thereby allowing controlled transmission of light through the said dynamic window.

In particular embodiments of the present invention, development of a stable dynamic windows using water as a green solvent is facile, wherein complete sealing of the said window from environmental wear and tear allows fatigue-free switching over multiple cycles.

Another aspect of the present invention is to render color tunability to the said dynamic windows via the controlled addition of water-soluble dyes at defined weight compositions, thereby the said dynamic windows may be chosen based on aesthetic considerations of an end-user or demand of the preferred application. Addition of the said dyes in fixed weight percentages, wherein the dyes do not interfere with the LCST switching phenomenon, except for changes in color, thereby allows access to generation of multi-colored LCST switching of optical transparency. Furthermore, the present invention also provides tuning of the switching temperature of the said dynamic windows, depending on the choice of the dye and its weight composition, thereby optical switching is made possible at controlled temperature exposure.

In a further aspect, the present invention intends to provide a strategy for energy efficiency in the indoor environment via dynamic modulation of heat and light transmission, wherein the temperature-dependent transparency of the said dynamic window directly correlates to the amount of energy required for indoor lighting and maintaining indoor temperature. The controlled heat/light transmission through the said dynamic windows leading to magnanimous reduction of indoor energy consumption thereby provides access to smart energy management and utilization systems.

Yet another aspect of the present invention is to identify the modulation of the cloud point temperature (LCST) via various physicochemical alterations, such as light irradiation, changes in pH, concentration or ratio of the corresponding isomeric forms, that modulates the cloud point temperature to a lower or higher value depending on the applied conditions.

In a further aspect, the present invention intends to provide a strategy for energy efficiency in the indoor environment via dynamic modulation of heat and light transmission, wherein the temperature-dependent transparency of the said dynamic window directly correlates to the amount of energy required for indoor lighting and maintaining indoor temperature. The controlled heat/light transmission allows magnanimous reduction of indoor energy consumption thereby provides access to smart energy management and utilization systems, apart from ensuring need-based privacy and aesthetic appeal, via a near-transparent absolutely public state below the respective cloud point temperature and a near-opaque absolutely private state.

LIST OF ABBREVIATIONS USED

LCST—Lower Critical Solution Temperature
$CO_2$—Carbon dioxide
cm—centimeter
RB—Round Bottom
mL—Milliliters
NMR—Nuclear Magnetic Resonance
Hz—Hertz
MHz—Megahertz
THF—Tetrahydrofuran

EXAMPLES

Following examples are given by way of illustration and therefore should not be construed to limit the scope of the invention.

Example 1. Synthesis of methyl 3, 4, 5-tris(2-(2-(2-methoxyethoxy)ethoxy)ethoxy)benzoate 2

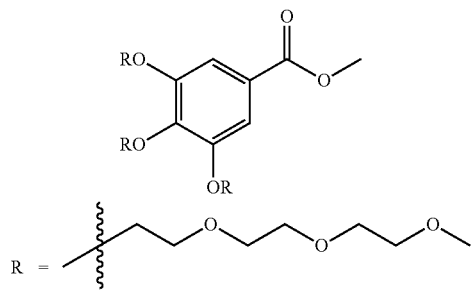

Under an atmosphere of nitrogen, methyl 3,4,5-trihydroxybenzoate, KI and K$_2$CO$_3$ were dissolved in a 250 mL two neck round bottom flask containing dry acetonitrile, to which 2-(2-(2-methoxyethoxy)ethoxy)ethyl 4-methylbenzenesulfonate 1 was added dropwise. The reaction mixture was stirred at 80° C. for 48 hours. After that, the solution was cooled to room temperature and evaporated the solvent under reduced pressure. The residue was obtained through solvent extraction process by using chloroform, washed with water, brine and dried over anhydrous sodium sulphate. The crude product was subjected to column chromatography (2% methanol/chloroform) over silica gel that gave the product. Yield: 90%. $^1$H NMR (500 MHz, CDCl$_3$): 7.26 (s, 2H), 4.20-4.15 (m, 6H), 3.85 (s, 3H), 3.83-3.77 (m, 6H), 3.76-3.70 (m, 6H), 3.69-3.62 (m, 12H), 3.61-3.58 (m, 6H), 3.50 (s, 3H), 3.34 (s, 6H) ppm. $^{13}$C NMR (125 MHz, CDCl$_3$): δ=166.9, 153, 142.8, 125.7, 108.9, 72.8, 72.1, 70.9, 70.9, 70.7, 70.6, 70.5, 69.9, 69.3, 58.4, 52.3 ppm. HRMS-FAB (m/z): Molecular formula (C$_{29}$H$_{50}$O$_{14}$) m/z calcd for [M]$^+$ 622.32; found 623.3291 [M+H]$^+$, 645.3109 [M+Na]$^+$.

Example 2 Synthesis of 3, 4, 5-tris(2-(2-(2-methoxyethoxy)ethoxy)ethoxy)benzoic acid 3

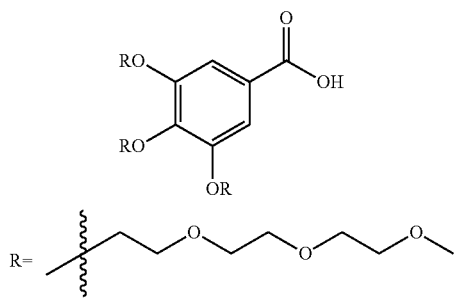

Methyl 3,4,5-tris(2-(2-(2-methoxyethoxy)ethoxy)ethoxy)benzoate 2 was taken in a 250 ml two neck round bottom flask containing 40 ml ethanol. KOH was added to it. The reaction mixture was stirred at 80° C. for 12 h. After that the solution was cooled to room temperature and solvent was evaporated under reduced pressure. The residue was extracted using chloroform and shake well with 10% HCl. The organic layer was washed with water, brine and dried over anhydrous sodium sulphate. The solvent was evaporated under reduced pressure to get the crude product. This was used for next step without further purification. Yield: 99%. 1H NMR (500 MHz, CDCl$_3$): δ=7.33 (s, 2H), 4.26-4.19 (m, 6H), 3.89-3.81 (m, 6H), 3.76-3.72 (m, 6H), 3.69-3.63 (m, 12H), 3.57-3.54 (m, 6H), 3.38 (s, 9H) ppm. $^{13}$C NMR (125 MHz, CDCl$_3$): δ=167.2 152.9, 142.7, 125.7, 117.9, 109.1, 72.8, 72.1, 70.9, 70.7, 70.7, 70.60, 70.5, 69.8, 69.3, 58.4 ppm. HRMS-FAB (m/z): Molecular formula (C$_{28}$H$_{48}$O$_{14}$) m/z calcd for [M]$^+$608.3032; found 631.3031 [M+Na]$^+$.

Example 3. Synthesis of 3, 4,5-tris(2-(2-(2-methoxyethoxy)ethoxy)ethoxy)benzoyl chloride 4

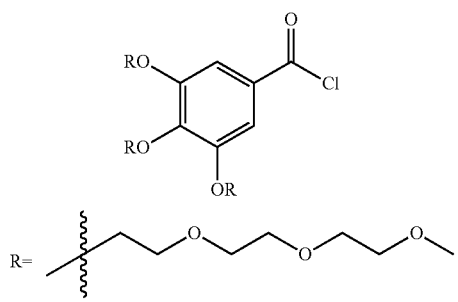

Under an atmosphere of nitrogen, 3,4,5-tris(2-(2-(2-methoxyethoxy)ethoxy)ethoxy)benzoic acid 3 was taken in a 250 ml two neck round bottom flask containing dry dichloromethane. SOCl$_2$ was added dropwise through dropping funnel under ice condition. The reaction mixture was allowed to stir at room temperature for 6 hours and then purged with nitrogen to remove solvent and unreacted SOCl$_2$. The crude product was used for next step without further purification and characterization.

Example 4. Synthesis of N-(4-(cyanomethyl) phenyl)-3,4,5-tris(2-(2-(2-methoxyethoxy) ethoxy) ethoxy)benzamide 5

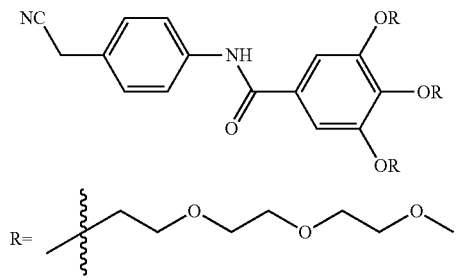

2-(4-aminophenyl) acetonitrile was dissolved in a 250 ml round bottom flask containing dry toluene under nitrogen atmosphere. Dry triethylamine was added to the reaction mixture and stirred at room temperature for 30 minutes. 3,4,5-tris(2-(2-(2-methoxyethoxy)ethoxy)ethoxy)benzoyl chloride was dissolved in dry toluene and added to the reaction mixture dropwise through dropping funnel. The solution was stirred at room temperature for 12 hours. After completion of reaction, solvent was evaporated and residue extracted using chloroform. Organic layer was washed with water, brine and dried over anhydrous sodium sulphate. The solvent was evaporated under reduced pressure and residue was purified by silica gel column chromatography as an eluent. Yield: 90%. 1H NMR (500 MHz, CDCl$_3$): δ=8.78 (s, 1H), 7.67-7.65 (d, J=8 Hz, 2H), 7.24-7.22 (d, J=8 Hz, 2H), 7.19 (s, 2H), 4.16 (m, 6H), 3.77-3.72 (m, 6H), 3.67 (s, 2H), 3.64-3.63 (m, 6H), 3.60-3.55 (m, 12H), 3.48-3.44 (m, 6H), 3.30 (s, 3H), 3.26 (s, 6H). $^{13}$C NMR (125 MHz, CDCl$_3$): δ=165.5, 152.5, 142.1, 138.4, 129.8, 128.4, 125.3, 120.9, 117.9, 108.1, 72.4, 71.9, 71.8, 70.6, 70.5, 70.3, 69.8, 69.2, 58.9, 23.1 ppm. HRMS-FAB (m/z): Molecular formula (C$_{36}$H$_{54}$N$_2$O$_{13}$) m/z for calcd [M]$^+$ 722.36; found 723.3733 [M+H]$^+$, 745.3550 [M+Na]$^+$.

Example 5. Synthesis of (Z)—N-(4-(1-cyano-2-(naphthalen-2-yl) vinyl) phenyl)-3,4,5-tris(2-(2-(2-methoxyethoxy)ethoxy)ethoxy)benzamide 6

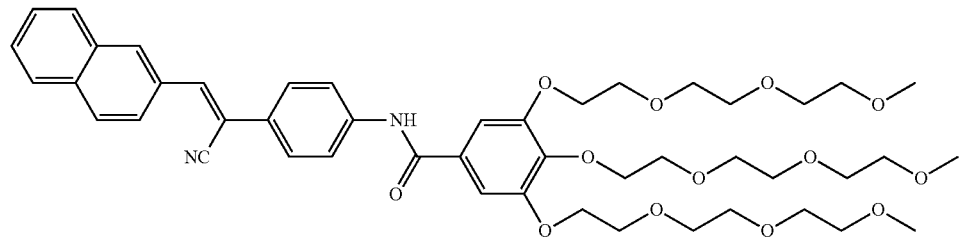 [SMILES: COCCOCCOCCOc1cc(C(=O)Nc2ccc(/C(C#N)=C/c3ccc4ccccc4c3)cc2)cc(OCCOCCOCCOC)c1OCCOCCOCCOC]

Under an atmosphere of nitrogen, N-(4-(cyanomethyl) phenyl)-3,4,5-tris(2-(2-(2-methoxyethoxy)ethoxy)ethoxy) benzamide 5, 2-naphthaldehyde were added in a 250 ml round bottom flask containing dry ethanol. The reaction mixture was stirred at room temperature for 30 minutes. After that, tert-butylammonium hydroxide was added through syringe. The solution was stirred at 50° C. for 12 hours. After cooled to room temperature, solvent was evaporated under reduced pressure. The crude product was extracted using chloroform, washed with water, brine and dried over anhydrous sodium sulphate. The solvent was evaporated under reduced pressure and residue was purified through silica gel column chromatography as an eluent. Yield: 90%. 1H NMR (500 MHz, CDCl$_3$): δ=8.91 (s, 1H), 8.35 (s, 1H), 8.11-8.09 (d, J=5 Hz, 1H), 8-7.94 (m, 3H), 7.89-7.87 (d, J=5 Hz, 2H), 7.78-7.76 (d, J=5 Hz, 2H), 7.60-7.58 (m, 2H), 7.24 (s, 2H), 4.23-4.21 (m, 4H), 4.17-4.16 (m, 2H), 3.83-3.81 (m, 4H), 3.75-3.73 (m, 2H), 3.66-3.64 (m, 12H), 3.60-3.55 (m, 12H), 3.46-3.45 (s, 3H), 3.29-3.28 (s, 6H) ppm. $^{13}$C NMR (125 MHz, CDCl$_3$): δ=166.7, 152.8, 141.2, 131.8, 131.3, 128, 127.7, 125, 123.8, 107.1, 72.7, 72.1, 70.9, 70.7, 70.6, 69.9, 69.2, 58.4, 42.2 ppm. HRMS-FAB (m/z): Molecular formula (C$_{47}$H$_{60}$N$_2$O$_{13}$), m/z calcd for [M]$^+$ 860.41, found 861.4182 [M+H]$^+$, 883.3996 [M+Na]$^+$.

Example 6. Synthesis of 4-(1,3-dioxolan-2-yl)pyridine 7

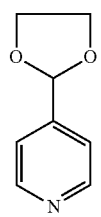

To a 250 mL round bottom flask, Isonicotinaldehyde, ethylene glycol and p-toluenesulfonic acid were dissolved in toluene. A Soxhlet extractor with drying agent (eg. molecular sieves) was installed and the reaction was refluxed for 24 hours. The reaction mixture was cooled to room temperature and solvent was evaporated under reduced pressure. Yield: 90%. $^1$H NMR (500 MHz, CDCl$_3$): δ=8.64-8.63 (d, J=2.5 Hz, 2H), 7.4-7.39 (d, J=2.5 Hz, 2H), 5.83 (S, 1H), 4.08-4.07 (dd, 4H) ppm. $^{13}$C NMR (125 MHz, CDCl$_3$): δ=150.19, 146.09, 121.3, 101.81, 65.54 ppm. HRMS-FAB (m/z): Molecular formula (C$_8$H$_9$NO$_2$) m/z for calcd [M]$^+$ 151.06; found 152.0715 [M+H]$^+$.

Example 7. Synthesis of 1-butyl-4-(1, 3-dioxolan-2-yl) pyridin-1-ium bromide 8

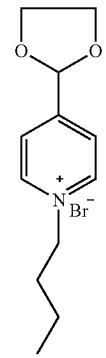

1-Bromobutane was added in a sealed tube containing 4-(1, 3-dioxolan-2-yl) pyridine 7 and the reaction mixture was refluxed for 20 hours. white crystallized product was formed and crude product was used for next step without further purification. Yield: 99%. $^1$H NMR (500 MHz, CDCl$_3$): δ=9.61-9.60 (d, J=2.5 Hz, 2H), 8.14-8.13 (d, J=2.5 Hz, 2H), 6.02 (s, 1H), 5.05-5.02 (t, J=7.5 Hz, 2H, 4.12-4.07 (m, 4H), 2.07-2.01 (m, 2H), 0.98-0.95 (t, J=7.5 Hz, 3H) ppm. $^{13}$C NMR (125 MHz, CDCl$_3$): δ=156.6, 145.5, 125.6, 100.1, 65.9, 61.6, 33.9, 19.3, 13.5 ppm. HRMS-FAB (m/z): Molecular formula (C$_{12}$H$_{18}$NO$_2$) m/z for calcd [M]$^+$ 208.13, found 208.1334 [M]$^+$.

Example 8. Synthesis of 2-(azulen-6-yl)-1,3-dioxolane 9

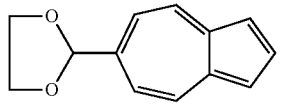 [SMILES: c1cc2ccc(C3OCCO3)ccc-2c1]

Under an atmosphere of nitrogen, compound 8 was dissolved in a round bottom flask containing anhydrous DMF. Sodium Cyclopentadienide was added dropwise at room temperature and stirred for 1 hour. Then, reaction mixture was refluxed for 12 hours. After completion of reaction, solvent was evaporated under reduced pressure and product was extracted using n-hexane, washed with water, brine and dried over anhydrous sodium sulphate. The solvent was evaporated under reduced pressure and crude product was purified by silica gel column chromatography (n-hexane) as an eluent to give 2-(azulen-6-yl)-1,3-dioxolane as a deep blue crystalline solid. Yield: 60%. 1H NMR (500 MHz, CDCl$_3$): δ=8.39-8.37 (d, J=10 Hz, 2H), 7.94-7.92 (t, J=5 Hz, 1H), 7.41-7.4 (d, J=2.5 Hz, 2H), 7.36-7.34 (d, J=10 Hz, 2H), 5.88 (s, 1H), 4.23-4.2 (t, J=7.5 Hz, 2H), 4.12-4.09 (t, J=7.5 Hz, 2H) ppm. $^{13}$C NMR (125 MHz, CDCl$_3$): δ=140.6, 135.3, 135.2, 129.8, 118.1, 117.1, 106, 66. HRMS-FAB (m/z): Molecular formula (C$_{13}$H$_{12}$O$_2$), m/z for calcd [M]$^+$ 200.08, found 201.0825 [M+H]$^+$.

Example 9. Synthesis of azulene-6-carbaldehyde 10

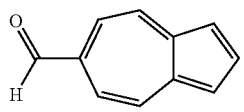 [SMILES: O=Cc1ccc2cccc-2cc1]

2-(azulen-6-yl)-1,3-dioxolane 9 was dissolved in a round bottom flask containing dichloromethane and 1 M HCl was added dropwise into it. The mixture was stirred at room temperature for 24 hours. The solution was extracted by dichloromethane, washed with water, brine and dried over anhydrous sodium sulphate. The solvent was evaporated and residue was purified by silica gel column chromatography (n-hexane) as an eluent to afford azulene-6-carbaldehyde as a blue solid. Yield: 90%. $^1$H NMR (500 MHz, CDCl$_3$): δ=10.12 (s, 1H), 8.54-8.52 (d, J=5 Hz, 2H), 8.12-8.10 (t, J=5 Hz, 1H), 7.74-7.72 (d, J=5 Hz, 2H), 7.52-7.51 (d, J=2.5 Hz, 2H) ppm. $^{13}$C NMR (125 MHz, CDCl$_3$): δ=194.7, 141.6, 141.3, 140.2, 135.2, 123.7, 119.8 ppm. HRMS-FAB (m/z): Molecular formula (C$_{11}$H$_8$O) m/z for calcd [M]$^+$ 156.06, found: 157.0611 [M+H]$^+$.

Example 10. Synthesis of (Z)—N-(4-(2-(azulen-6-yl)-1-cyanovinyl) phenyl)-3,4,5-tris(2-(2-(2-methoxyethoxy)ethoxy)ethoxy)benzamide 11

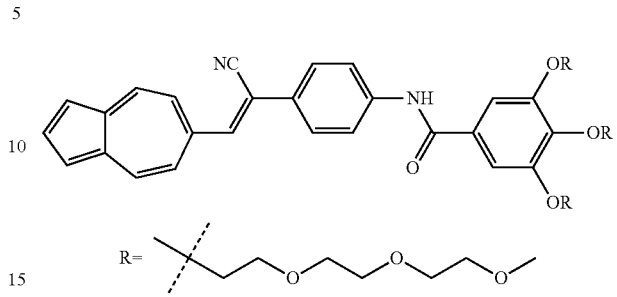

Under an atmosphere of nitrogen, N-(4-(cyanomethyl) phenyl)-3,4,5-tris(2-(2-(2-methoxyethoxy)ethoxy)ethoxy) benzamide 5 and azulene-6-carbaldehyde 10 were added in a 250 ml round bottom flask containing ethanol. The reaction mixture was stirred at room temperature for 30 min. After that, tert-butylammonium hydroxide was added dropwise and solution was stirred at 50° C. for 12 hours. After cooled to room temperature, solvent was evaporated under reduced pressure. The crude product was extracted using chloroform, washed with water, brine and dried over anhydrous sodium sulphate. The solvent was evaporated under reduced pressure and residue was purified through silica gel column chromatography as an eluent. Yield: 90%. 1H NMR (500 MHz, CDCl$_3$): δ=8.97 (s, 1H), 8.4-8.38 (d, J=5 Hz, 2H), 7.98-7.97 (t, J=1.5 Hz, 1H), 7.87-7.85 (d, J=5 Hz, 2H), 7.75 (s, 1h), 7.73-7.71 (d, J=5 Hz, 2H), 7.61-7.59 (d, J=5 Hz, 2H), 7.44-7.43 (d, J=2.5 Hz, 2H), 7.31 (s, 2H), 4.28-4.24 (m, 6H), 3.87-3.80 (m, 4H), 3.73-3.67 (m, 2H), 3.65-3.63 (m, 8H), 3.56-3.52 (m, 12H), 3.38 (s, 3H), 3.34 (s, 6H) ppm. $^{13}$C NMR (125 MHz, CDCl$_3$): δ=166.5, 152.6, 144.8, 142.4, 142.1, 140.1, 139, 135.3, 129.7, 126.9, 120.6, 119.3, 114.5, 108.4, 71.9, 71.9, 70.7, 70.6, 70.5, 70.5, 70.5, 70.4, 69.9, 59, 58.9 ppm. HRMS-FAB (m/z): Molecular formula (C$_{47}$H$_{60}$N$_2$O$_{13}$) calcd.: 860.41, found=861.4188 [M+H]$^+$, 883.4004 [M+Na]$^+$, 899.3737 [M+K]$^+$.

Example 11. Synthesis of diethyl (4-nitrobenzyl) phosphonate 12

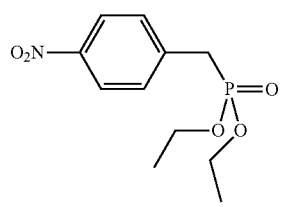 [SMILES: CCOP(=O)(Cc1ccc([N+](=O)[O-])cc1)OCC]

Under an atmosphere of nitrogen, a mixture of 4-nitrobenzyl bromide and triethylphosphite was refluxed at 120° C. for 6 hours and purged with nitrogen to remove excess amount of triethylphosphite to provide diethyl 4-nitrobenzylphosphonate as a brown oil. Yield: 99%. 1H NMR (500 MHz, CDCl$_3$): δ=8.13-8.11 (d, J=10 Hz, 2H), 7.41-7.4 (d, J=5 Hz, 2H) 4.06-4.02 (m, 4H), 3.2-3.16 (d, J=20 Hz, 2H), 1.21-1.18 (t, J=7.5 Hz, 6H). $^{13}$C NMR (125 MHz, CDCl$_3$): δ=139.7, 130.6, 123.7, 62.5, 34.8, 16.3.

Example 12. Synthesis of (E)-2-(4-nitrostyryl) naphthalene 13

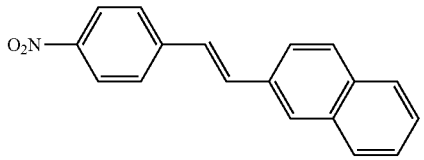 [SMILES: O=[N+]([O-])c1ccc(/C=C/c2ccc3ccccc3c2)cc1]

Diethyl 4-nitrobenzylphosphonate 12 and 2-napthaldehyde were added in a 2-neck round bottom flask under nitrogen atmosphere. Dry ethanol was added and stirred at room temperature for 30 minutes. Then, sodium methoxide was added into this and stirred for 12 hours. After that pale yellow precipitate formed. Crude product was filtered and washed with ethanol, dried up. Yield: 90%. 1H NMR (500 MHz, CDCl$_3$): δ=8.18-8.17 (d, J=5 Hz, 2H), 7.85 (s, 1H), 7.80-7.76 (m, 3H), 7.69-7.68 (d, J=5 Hz, 1H), 7.62-7.60 (d, J=10 Hz, 2H), 7.44-7.43 (m, 2H), 7.38-7.35 (d, J=15 Hz, 1H), 7.22-7.19 (d, J=15 Hz, 1H). $^{13}$C NMR (125 MHz, CDCl$_3$): δ=146.8, 143.9, 133.6, 133.5, 133.4, 128.6, 128.2, 127.9, 127.7, 126.8, 126.6, 126.5, 124.2, 123.2. HRMS-FAB (m/z): Molecular formula (C$_{18}$H$_{13}$NO$_2$) calcd.: 275.0946, found=275.1622 [M]$^+$.

Example 13. Synthesis of (E)-4-(2-(naphthalen-2-yl)vinyl)aniline 14

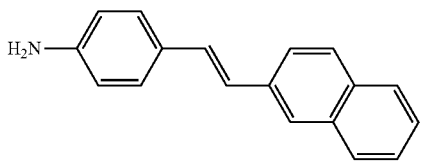

(E)-2-(4-nitrostyryl) naphthalene 13 (100 mg) was taken in a two neck round bottom flask containing anhydrous ethanol under nitrogen atmosphere. Stannous chloride dihydrate (410 mg, 5 mmol) was added and the mixture was heated at 80° C. and stirred overnight. After the reaction, the mixture was allowed to cool to room temperature, followed by the addition of aqueous NaHCO$_3$ until the pH reached 8. Then, solution was extracted with DCM, washed with H$_2$O and brine, then dried over anhydrous Na$_2$SO$_4$ and filtered and concentrated under reduced pressure to afford an orange-yellow solid. The product was purified by silica gel column chromatography using CHCl$_3$. Yield: 90%. 1H NMR (500 MHz, CDCl$_3$): δ=7.73-7.72 (m, 4H), 7.65-7.63 (d, J=10 Hz, 1H), 7.4-7.34 (m, 2H), 7.33-7.31 (d, J=10 Hz, 2H), 7.1-7 (m, 2H), 6.64-6.62 (d, J=10 Hz, 2H), 3.7 (s, 2H). $^{13}$C NMR (125 MHz, CDCl$_3$): δ=146.2, 132.7, 129, 128.1, 127.8, 127.6, 126.2, 125.7, 125.5, 125.1, 123.5, 115.2. HRMS-FAB (m/z): Molecular formula (C$_{18}$H$_{15}$N) calcd.: 245.1204, found=246.1288 [M]$^+$.

Example 14. Synthesis of (E)-3,4,5-tris(2-(2-(2-methoxyethoxy)ethoxy)ethoxy)-N-(4-(2-(naphthalen-2-yl)vinyl)phenyl)benzamide 15

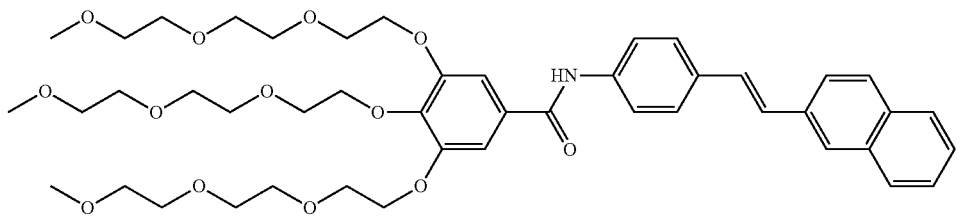 [SMILES: COCCOCCOCCOc1cc(C(=O)Nc2ccc(/C=C/c3ccc4ccccc4c3)cc2)cc(OCCOCCOCCOC)c1OCCOCCOCCOC]

3,4,5-tris(2-(2-(2-methoxyethoxy)ethoxy)ethoxy)benzoic acid 3 and (E)-4-(2-(naphthalen-2-yl)vinyl)aniline 14 were taken in a two neck round bottom flask containing anhydrous dichloromethane under nitrogen atmosphere. 1-Ethyl-3-(3-dimethylaminopropyl)carbodiimide, Hydroxybenzotriazole, N,N-Diisopropylethylamine were added and stirred at room temperature for 20 hours. After completion of reaction, the reaction mixture was quenched with water and extracted with dichloromethane, then dried over anhydrous Na$_2$SO$_4$ and filtered and concentrated under reduced pressure to afford an orange-yellow liquid. The product was purified by silica gel column chromatography using methanol/chloroform (10%) mixture. Yield: 80%. 1H NMR (500 MHz, CDCl$_3$): δ=8.55 (s, 1H), 7.79-7.74 (m, 4H), 7.68-7.65 (m, 2H), 7.5-7.49 (d, J=5 Hz, 2H), 7.45-7.39 (m, 2H), 7.25-7.16 (m, 3H), 4.2-4.14 (m, 6H), 3.8-3.74 (m, 6H), 3.66-3.6 (m, 16H), 3.59-3.47 (m, 8H), 3.30 (s, 6H), 3.27 (s, 3H). $^{13}$C NMR (500 MHz, CDCl$_3$): δ=169.7, 166.1, 152.4, 132.9, 128.3, 127.1, 126.4, 126.3, 125.9, 120.4, 109.2, 108.1, 72.4, 71.9, 70.8, 70.6, 70.5, 70.4, 69.6, 69.2, 68.9, 59. HRMS-FAB (m/z): Molecular formula (C$_{46}$H$_{61}$NO$_{13}$) calcd.: 835.4143, found=858.4112 [M+Na]$^+$.

Example 15. Synthesis of (Z)—N-(4-(1-cyano-2-(pyren-1-yl)vinyl)phenyl)-3,4,5-tris(2-(2-(2-methoxyethoxy)ethoxy)ethoxy)benzamide 16

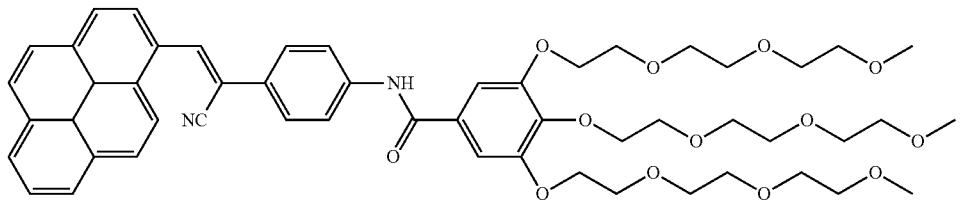 [SMILES: COCCOCCOCCOc1cc(C(=O)Nc2ccc(/C(C#N)=C/C3=CC=C4C=CC5=CC=CC6=CC=C3C4C56)cc2)cc(OCCOCCOCCOC)c1OCCOCCOCCOC]

Under an atmosphere of nitrogen, N-(4-(cyanomethyl)phenyl)-3,4,5-tris(2-(2-(2-methoxyethoxy)ethoxy)ethoxy)

benzamide 5, pyrene-1-carbaldehyde were added in a 250 mL round bottom flask containing dry ethanol. The reaction mixture was stirred at room temperature for 30 minutes. After that, tert-butylammonium hydroxide was added through syringe. The solution was stirred at 50° C. for 12 hours. After cooled to room temperature, solvent was evaporated under reduced pressure. The crude product was extracted using chloroform, washed with water, brine and dried over anhydrous sodium sulphate. The solvent was evaporated under reduced pressure and residue was purified through silica gel column chromatography as an eluent. Yield: 90%. 1H NMR (500 MHz, CDCl$_3$): δ=8.78 (s, 1H), 8.59-8.57 (d, J=8 Hz, 1H), 8.48 (s, 1H), 8.23-8.21 (t, J=4 Hz, 1H), 8.2-8.19 (d, J=1.2 Hz, 3H), 8.19-8.17 (d, J=8 Hz, 1H), 8.14-8.12 (d, J=8 Hz, 1H), 8.09-8.07 (d, J=8 Hz, 1H), 8.04-8.03 (d, J=4 Hz, 1H), 7.83-7.82 (d, J=4 Hz, 2H), 7.78-7.76 (d, J=8 Hz, 2H), 7.26 (s, 2H), 4.22-4.17 (m, 6H), 3.8-7.78 (m, 4H), 3.75-3.74 (m, 2H), 3.67-3.66 (m, 6H), 3.62-3.61 (m, 4H), 3.6-3.57 (m, 8H), 3.49-3.46 (m, 6H), 3.31 (s, 3H), 3.27 (s, 6H) ppm. $^{13}$C NMR (125 MHz, CDCl$_3$): δ=165.5, 162, 152.6, 151.5, 139.1, 130.7, 129.8, 128.7, 128.1, 127.4, 126.8, 126.3, 126.1, 126, 125, 120.6, 114.3, 108.3, 71.9, 70.6, 70.5, 70.4, 69.3, 59, 58.9 ppm. HRMS-FAB (m/z): Molecular formula (C$_{53}$H$_{62}$N$_2$O$_{13}$), m/z, Calcd for [M]$^+$ 934.4252, found 935.4341 [M+H]$^+$, 957.4154 [M+Na]$^+$.

Example 16. Fabrication of the Prototype Dynamic Windows

A molecule selected from the class of molecules of general formula 1 was dissolved in water to obtain a final concentration of 0.025-5 mM. A water-soluble dye of any color was optionally added to the above solution (final ratio of dye to active materials was 1:100-1:1000). The above solution was sandwiched between two glass plates (up to 10 cm×10 cm), separated by a spacer and the glass plates were sealed from all sides. The said window was exposed to the predetermined set of temperature to tune its opacity/transparency.

ADVANTAGES OF THE INVENTION

Inherently white shades

Switching temperature near room temperature

No need for any additional energy input

Uniform switchability

Programmable response temperature

Easy to synthesize, handle and scale up

Highly photostable

Cost-effective large area fabrication is feasible

Small amounts of thermoresponsive materials required to fabricate windows

Water is used as the primary solvent—an environment-friendly system

Multiple colors can be achieved using water-soluble dyes

Sandwich type design allows reuse of existing window glass panels

We claim:

1. A molecule of general formula 1

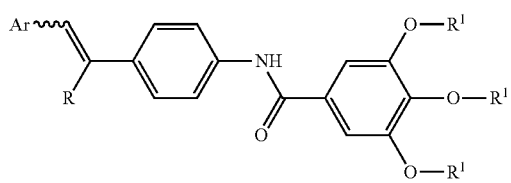

wherein,

R$^1$ is selected from [(CH$_2$)$_a$—O]$_b$—CH$_3$ wherein, a is an integer a=1 or 2, b is an integer b=2-20;

R is independently selected from H, CN, or halogens; and

Ar is an aryl group, wherein the aryl group comprises of single or multiple fused rings, wherein the number of multiple fused rings is 1-5, wherein the aryl groups optionally substituted with halogen, OH, —CN, —O(C$_1$-C$_{30}$ alkyl chain), —(NH)$_{1-2}$(C$_1$-C$_{30}$ alkyl chain), —N((C$_1$-C$_{30}$ alkyl chain))$_2$, —COOH, or —COO(C$_1$-C$_{30}$ alkyl chain).

2. The molecule according to claim 1, wherein the molecule is in synthesized Z-form and upon irradiation with light of 365 nm for 5-20 minutes at a concentration in a range 1 pM to 10 M undergoes a one-way photoreaction to yield a stable photoproduct, that is stable under ambient environment of 20-40° C., 1 atmospheric pressure and 0-95% relative humidity, or continuous light irradiation using any wavelength between 265 nm and 780 nm or continuous thermal treatment at 25-120° C. or a combination of the said stimuli, for a minimum of 60-365 days; wherein a solution of the molecule is prepared in an organic solvent; wherein the organic solvent is selected from the group consisting of acetonitrile, alcohols, dimethyl formamide, dimethyl sulfoxide, acetone, toluene and xylene.

3. The molecule according to claim 2, wherein the molecule in synthesized the Z-form is at a concentration of at 1 mM.

4. The molecule according to claim 1, wherein the molecule is in synthesized Z-form and upon irradiation with light of 365 nm for 5-20 minutes at a concentration of 1 mM, as its aqueous solution, undergoes a reversible photoreaction to yield the isomerized E-photoproduct, that reverses back to the initial Z-form upon thermal treatment at 60-100° C. for a period in a range of 0.1-10 hours.

5. The molecule according to claim 1, wherein the molecule is in thermoresponsive solution of its isomers and a concentration of the molecule is in a range of 0.25 mM to 500 mM and temperature tunable transparency (LCST) is in a range of 20° C.-45° C.

6. The molecule according to claim 5, wherein the temperature tunable transparency and the lower critical solution temperature is modulated by light irradiation, comprising a wavelength of 365 nm, whereby photoirradiation allows for tuning the cloud point temperature and the lower critical solution temperature to a lower value, in a range of 28-31° C., while that before irradiation is in a range 35-38° C. at a concentration of 0.5-1 mM, with a concomitant decrease in cloud point temperature and the lower critical solution temperature after photoirradiation at a concentration in a range 1 pM to 10 M.

7. The molecule according to claim 5, wherein the temperature tunable transparency is modulated by changes in pH in a range 0-14, whereby increasing the pH allows for tuning the cloud point temperature (LCST) to a higher value, at a concentration of 1 mM, such that the cloud point temperature (LCST) is 22-25° C. at pH ≤1 and 36-40° C. at pH ≥7, with a concomitant increase in cloud point temperature (LCST) with increasing pH at a concentration in a range 1 pM to 10 M.

8. The molecule according to claim 5, wherein fluorescent emission of the thermoresponsive solution is modulated by photoirradiation using a wavelength of 365 nm, with lowering of fluorescence intensity for the E-isomer formed by photoirradiation of the Z-isomer, with a concomitant decrease in cloud point temperature (LCST) after photoirradiation at a concentration in a range 1 pM to 10 M.

9. The molecule according to claim 5, wherein the fluorescent emission is further modulated by changes in temperature in a range 20-70° C., with a concomitant decrease in fluorescence with increasing temperature at a concentration in a range 1 pM-10M for both the E and Z-isomers, along with a temperature dependent transparency change occurring at the respective cloud point temperature and the lower critical solution temperature.

10. The molecule according to claim 5, wherein the temperature dependent transparency change is an associated function of the molar concentration of the thermoresponsive solution such that the cloud point temperature and the lower critical solution temperature changes by 2-3° C. for every mM change in concentration and with detectable changes in cloud point temperature (LCST) for sub-millimolar changes in concentration.

11. The molecule according to claim 5, wherein the cloud point temperature and the lower critical solution temperature is an associated function of ratio of the E: Z forms, such that the cloud point temperature is lower for a lower percentage of Z-isomer and increases with subsequent increase in the percentage of the Z-isomer in a weighted composition containing a mixture of the E and Z isomers.

12. The molecule according to claim 11, wherein a ratio of 10:0 the E: Z exhibits a cloud point temperature in a range 29-30° C. and a ratio of 0:10 the E: Z exhibits a cloud point temperature in a range 37-38° C., with at least 1-2° C. increase in the cloud point temperature for every 20% increase in the Z-isomer at a concentration of 1 mM.

13. The molecule according to claim 5, wherein response time is further an associated function of the conformation viz the E or the Z-isomer of the molecule having general formula 1, with a lower response time for the Z-isomer under both heating and cooling cycles.

14. The molecule according to claim 13, wherein the response time is in a range of 2-4 seconds of the heating cycle, and 20-30 seconds of the cooling cycle for the Z-isomer, and in a range of 3-5 seconds of the heating cycle, and 30-40 seconds of the cooling cycle for the E-isomer at a concentration of 1 mM in water, thereby enabling a faster response of Z-isomer of the molecule having general formula 1 than the E-isomer of the molecule having general formula 1 obtained by light irradiation as claimed in claim 4, at any concentration.

15. The molecule according to claim 5, wherein the thermoresponsive solution is used for fabricating a dynamic window by sandwiching the solution between two transparent substrates, thereby allowing tunability of transparency via LCST phase transitions triggered by controlled temperature exposure, at temperature in the range of 20° C.-45° C.

16. The molecule according to claim 15, wherein the dynamic window renders a colorless light transmission mode below the respective cloud point temperature or the lower critical solution temperature and an opaque white shade above the cloud point temperature or the lower critical solution temperature.

17. The molecule according to claim 15, wherein the dynamic window having color tunability spanning the RGB color space via controlled addition of water-soluble dyes at defined weight compositions in a range of 1:100 to 1:1000 (dye: active material), wherein the dyes are independently selected from a set of commercial or synthetic water soluble dyes, wherein the synthetic water soluble dyes are selected from a group consisting of methylene blue, rhodamine B, Nile blue, methyl orange, malachite green, and rose bengal.

18. The molecule according to claim 15, wherein the cloud point temperature and the lower critical solution temperature is modulated by light irradiation, changes in pH, concentration or ratio of the corresponding the E: Z forms according to claim 6.

19. The molecule according to claim 15, wherein the dynamic window is emissive under UV light irradiation and the intensity of emission is an associated function of temperature, without any loss of transparency switching at the cloud point temperature.

20. The molecule according to claim 15, wherein the dynamic window is used as smart window components in energy-efficient buildings, indoor environments, with solar, luminous and IR transmittance >50%, wherein the use of the dynamic window results in a decrease of indoor temperature by 2-8° C., leading to a near-transparent absolutely public state below the respective cloud point temperature and a near-opaque absolutely private state above the said cloud point temperature, thereby ensuring need-based privacy apart from imparting high energy efficiency to the built environments employing these dynamic windows.

* * * * *